US012761670B2

(12) United States Patent
Gu et al.

(10) Patent No.: US 12,761,670 B2
(45) Date of Patent: Oct. 13, 2026

(54) HETEROGENEOUS ROBOT SYSTEM COMPRISING EDGE SERVER AND CLOUD SERVER, AND METHOD FOR CONTROLLING SAME

(71) Applicant: LG ELECTRONICS INC., Seoul (KR)

(72) Inventors: Sewan Gu, Seoul (KR); Youngjae Kim, Seoul (KR); Seungmin Baek, Seoul (KR); Hyunseok Yang, Seoul (KR); Sungkyu Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 18/580,791

(22) PCT Filed: Jul. 6, 2022

(86) PCT No.: PCT/KR2022/009756
§ 371 (c)(1),
(2) Date: Jan. 19, 2024

(87) PCT Pub. No.: WO2023/003226
PCT Pub. Date: Jan. 26, 2023

(65) Prior Publication Data

US 2024/0272649 A1 Aug. 15, 2024

(30) Foreign Application Priority Data

Jul. 22, 2021 (KR) ........................ 10-2021-0096536
Jul. 22, 2021 (KR) ........................ 10-2021-0096538

(51) Int. Cl.
*G05D 1/69* (2024.01)
*G05D 1/86* (2024.01)
(Continued)

(52) U.S. Cl.
CPC ................ *G05D 1/69* (2024.01); *G05D 1/86* (2024.01); *G05D 2101/15* (2024.01); *G05D 2101/22* (2024.01); *G05D 2111/32* (2024.01)

(58) Field of Classification Search
CPC ......... B25J 5/00; B25J 9/00; B25J 9/16; B25J 13/00; G05D 1/69; G05D 1/692;
(Continued)

(56) References Cited

U.S. PATENT DOCUMENTS 11,032,022 B1 * 6/2021 Sen ..................... H04W 12/122
2018/0300835 A1 10/2018 Saboo et al.
(Continued)

FOREIGN PATENT DOCUMENTS

CN 111360813 7/2020
CN 111360813 A * 7/2020 ............ B25J 9/1682
(Continued)

OTHER PUBLICATIONS

English Machine Translation of JP2018148321A, Accessed Jun. 27, 2025.*
(Continued)

*Primary Examiner* — Blake A Wood
(74) *Attorney, Agent, or Firm* — LEE, HONG, DEGERMAN, KANG & WAIMEY

(57) ABSTRACT

The present embodiment relates to a cloud-based robot control method for controlling a plurality of robots which are positioned in a plurality of spaces divided arbitrarily, the method comprising the steps of: generating a control base model which can be applied to the plurality of robots in a cloud server; distributing the control base model to edge servers allocated to respective spaces; upgrading the control base model in accordance with the plurality of robots of a space, in the edge server; directly transmitting the upgraded control model from the edge server to another edge server;
(Continued)

and controlling the plurality of robots by means of the upgraded control model in the edge server. Therefore, by sharing a deep-learning model among edge servers, supporting heterogeneous robots and heterogeneous services is possible. Further, a base deep-learning model from the cloud server is tuned into a customized deep-learning model to be suitable for respective robots in the edge server, and the deep-learning model is upgraded to an adaptive deep-learning model to be suitable for a service provided by respective robots, and thus an optimized service can be provided.

18 Claims, 15 Drawing Sheets

(51) Int. Cl.

*G05D 101/00* (2024.01)
*G05D 101/15* (2024.01)
*G05D 111/30* (2024.01)

(58) Field of Classification Search

CPC .... G05D 1/6987; G05D 1/86; G05D 2101/15; G05D 2101/22; G05D 2105/31; G05D 2107/60; G05D 2109/11; G05D 2111/32; G06F 8/65; G06N 20/00

See application file for complete search history.

(56) References Cited

U.S. PATENT DOCUMENTS

2019/0079898 A1* 3/2019 Xiong .................. G06F 9/5072
2020/0034655 A1* 1/2020 Gupta .................... G06N 20/20
2020/0050951 A1* 2/2020 Wang ..................... G06N 20/00
2021/0323159 A1* 10/2021 Park ....................... B25J 9/1689

FOREIGN PATENT DOCUMENTS

EP 3483794 5/2019
JP 2018-148321 9/2018
KR 10-2017-0085536 7/2017
KR 10-2020-0063340 6/2020
KR 10-2021-0057709 5/2021

OTHER PUBLICATIONS

English Machine Translation of CN111360813A, Accessed Jun. 27, 2025.*
English Machine Translation of KR20200063340A, Accessed Jun. 27, 2025.*
PCT International Application No. PCT/KR2022/009756, International Search Report dated Oct. 27, 2022, 5 pages.
Korean Intellectual Property Office Application No. 10-2021-0096536, Office Action dated Oct. 16, 2025, 6 pages.

* cited by examiner

[FIG. 1]
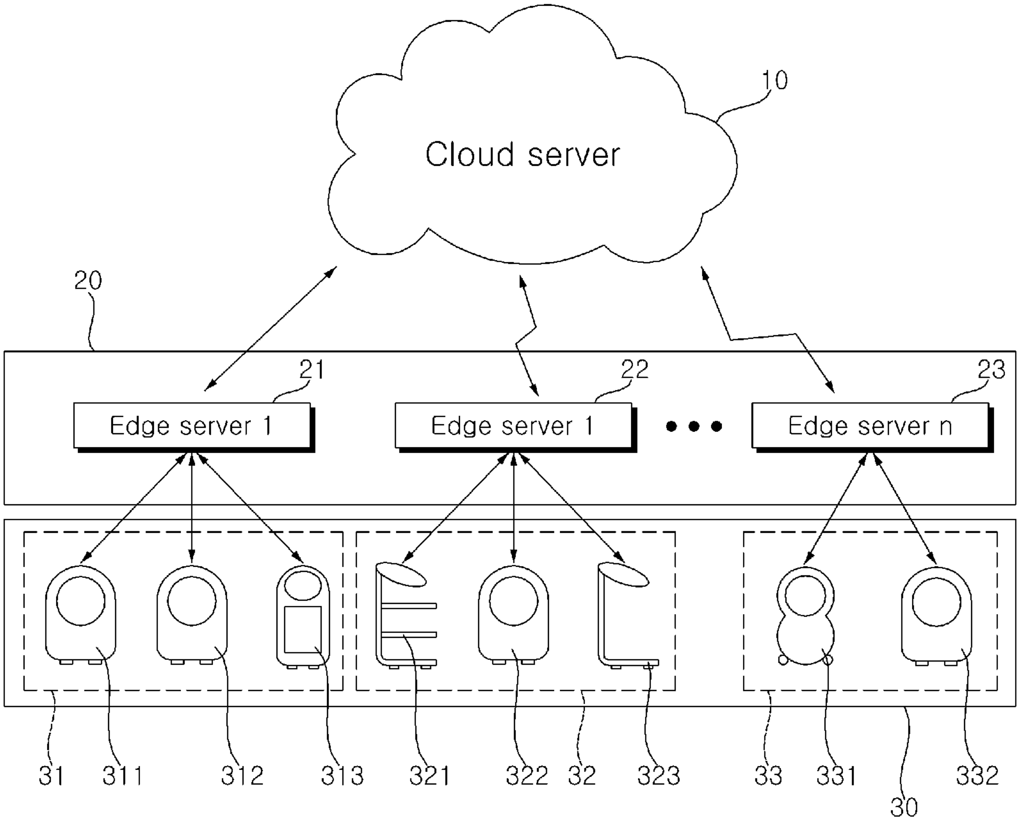

[FIG. 2]
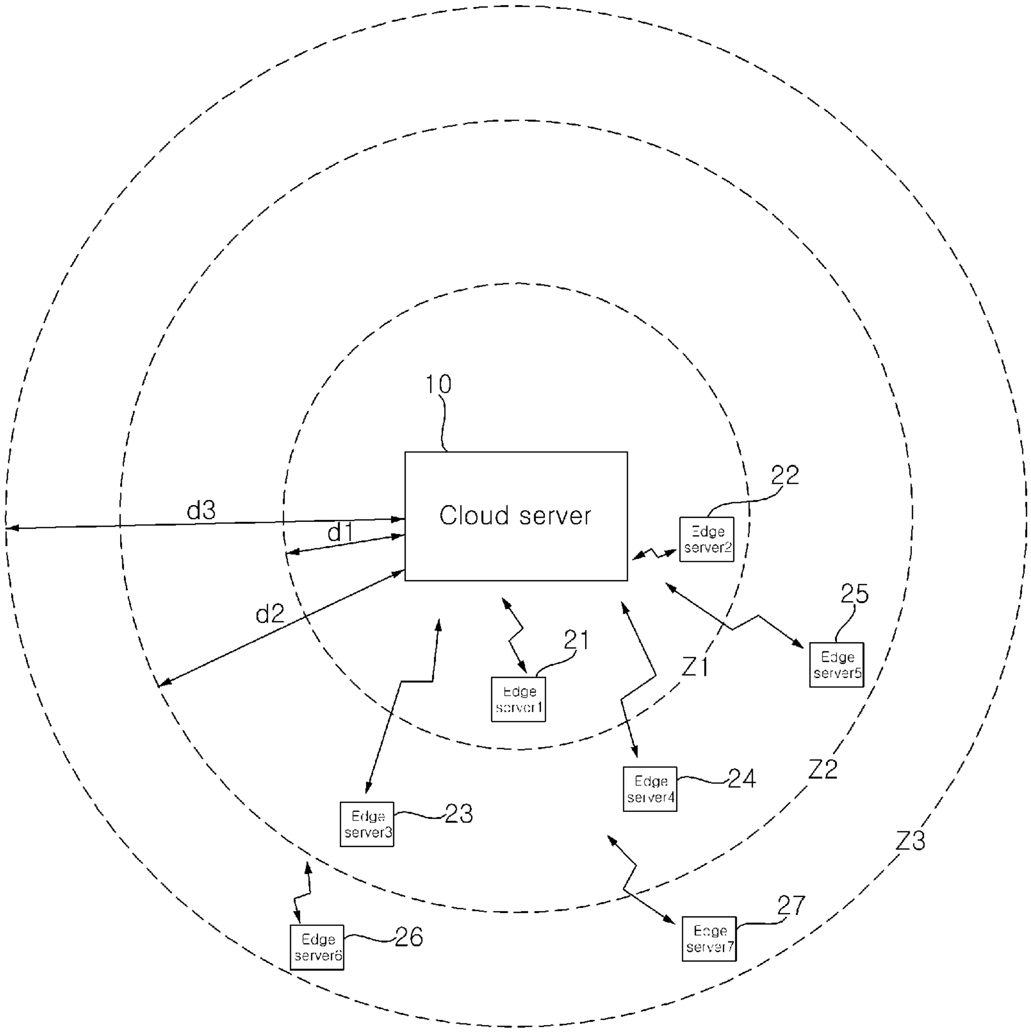

[FIG. 3]
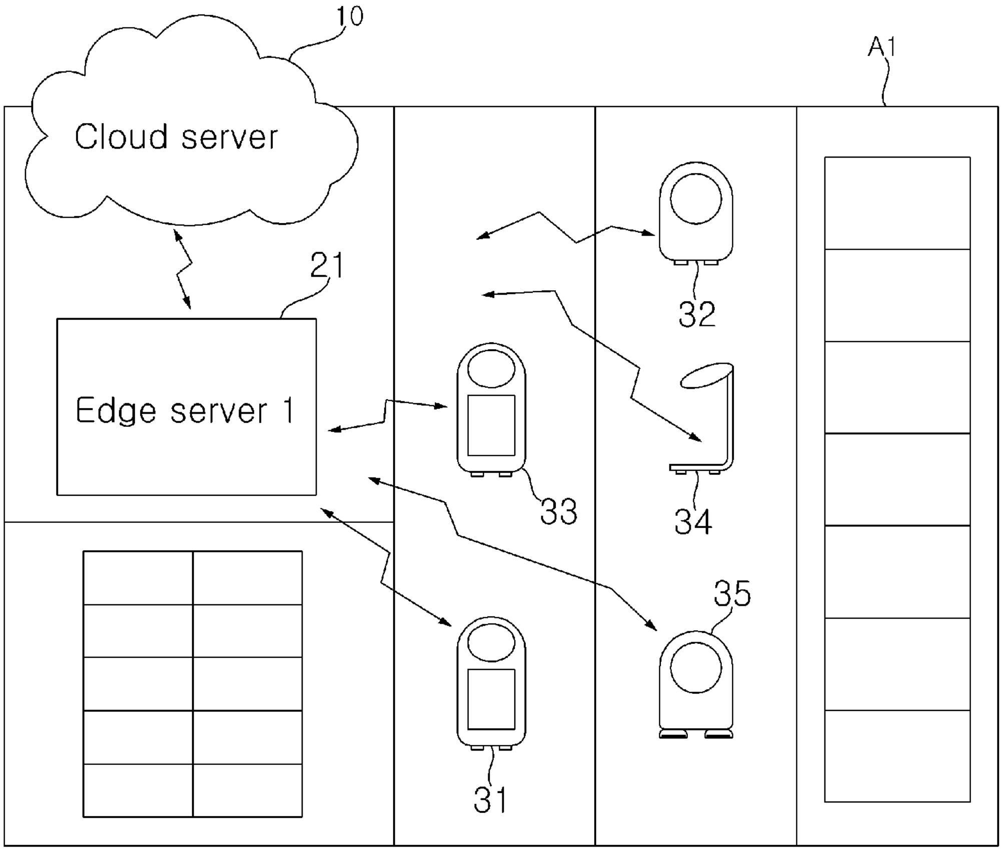

[FIG. 4]
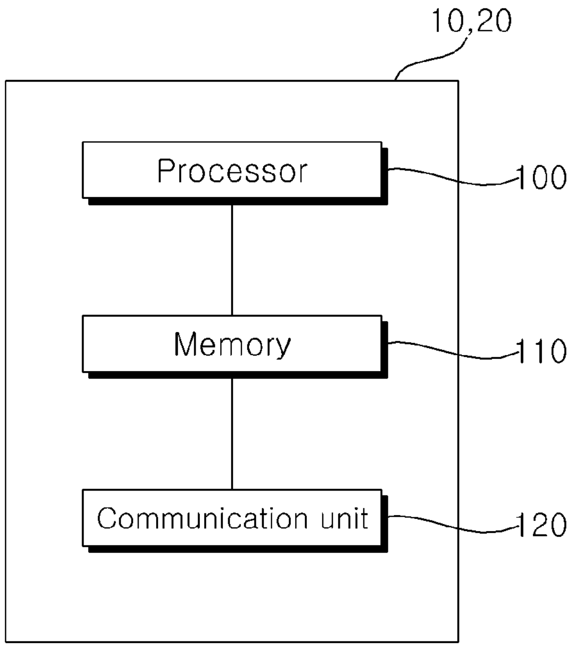

[FIG. 5]
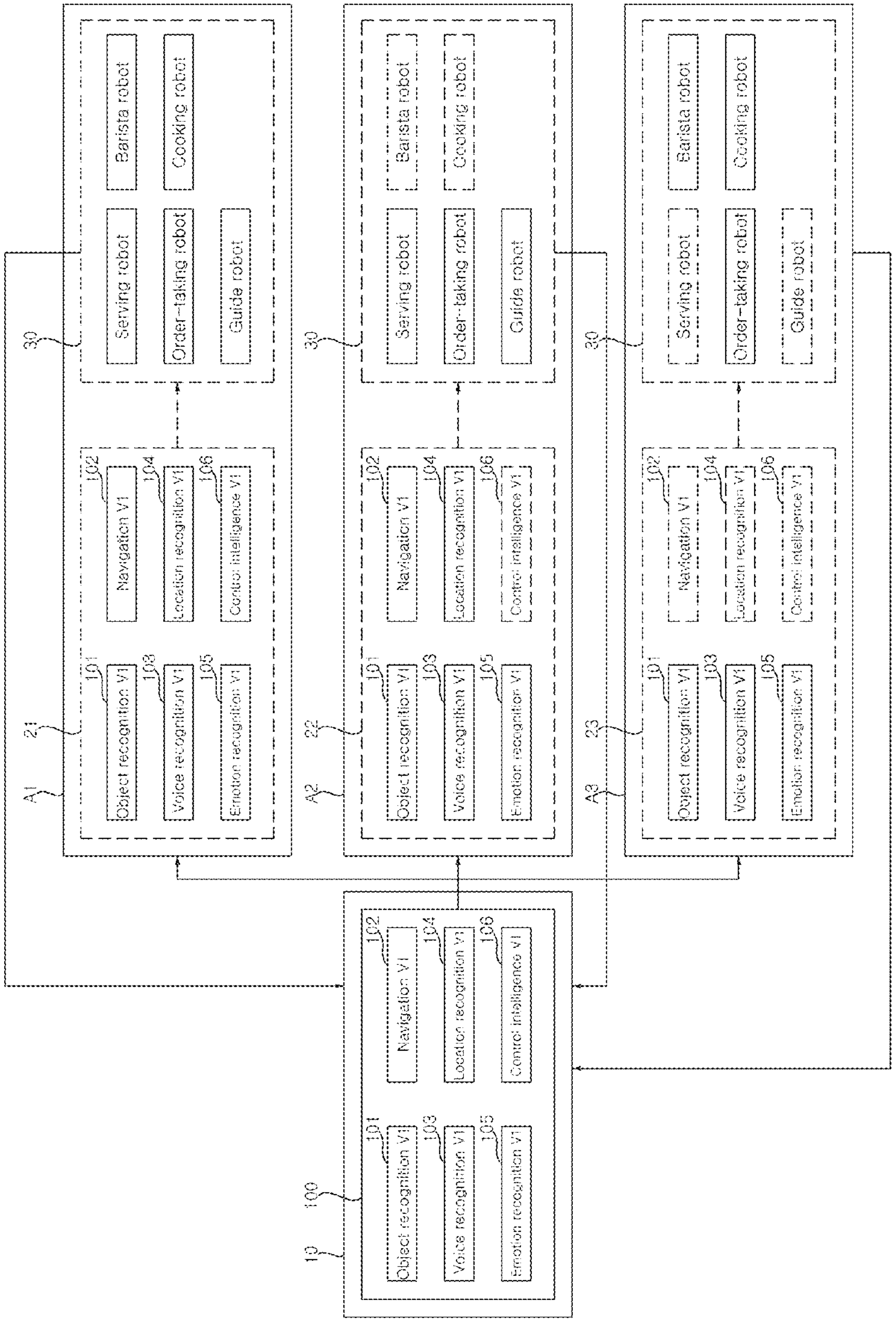

[FIG. 6]
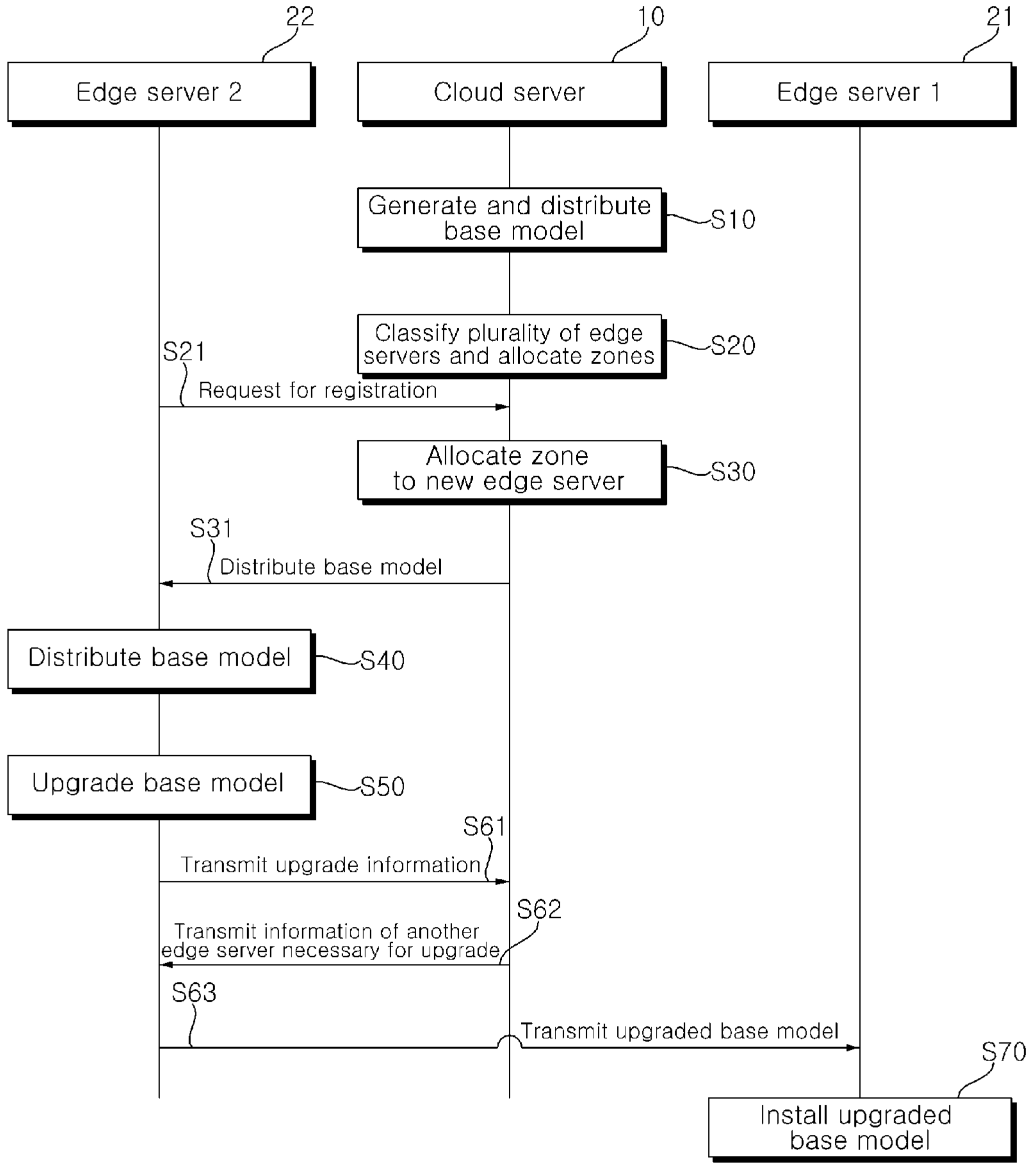

[FIG. 7]
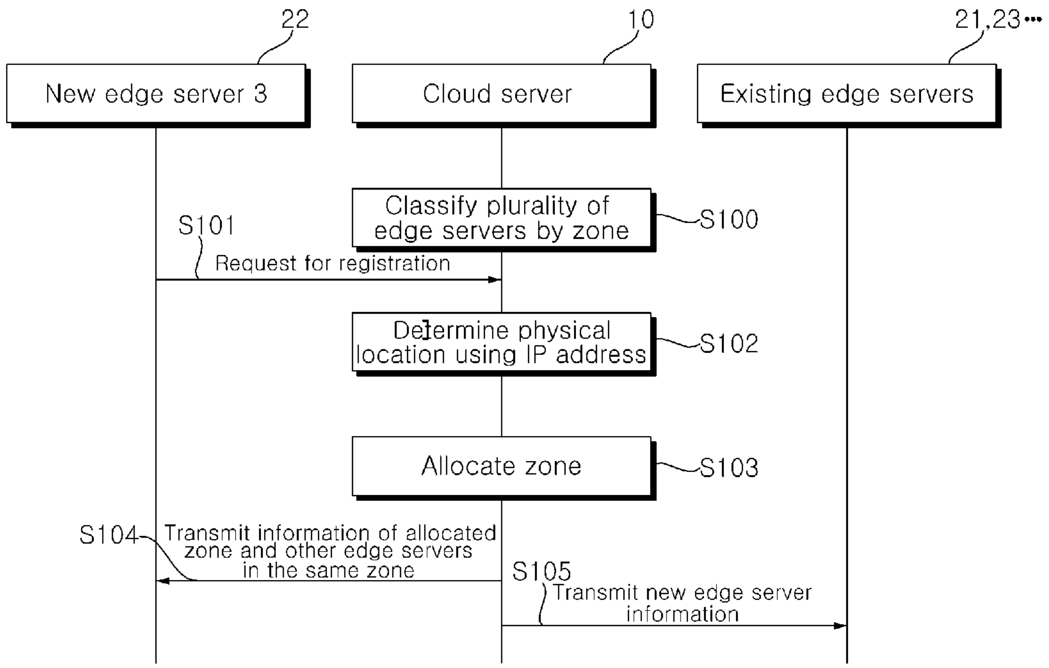

[FIG. 8]
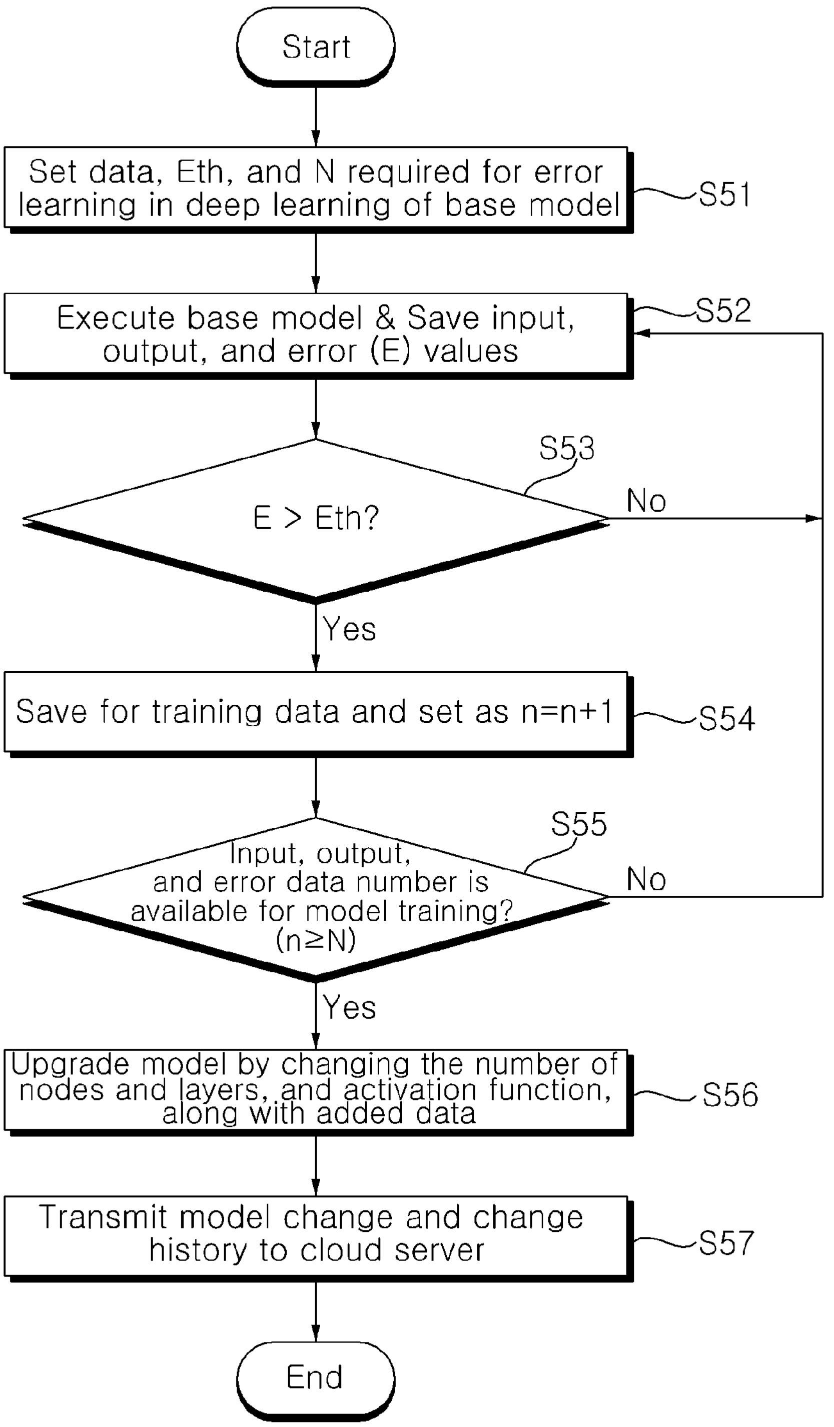

[FIG. 9]
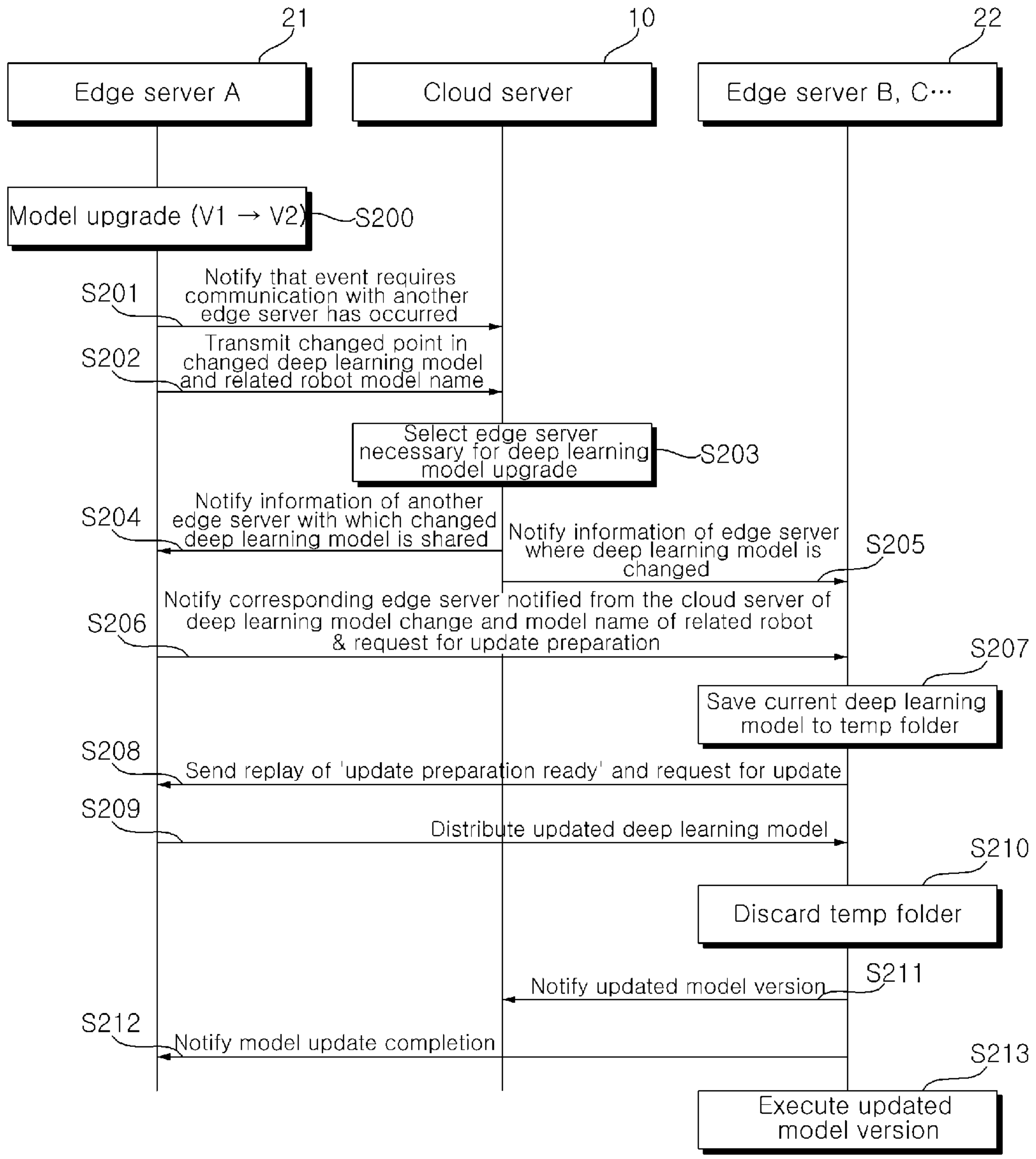

[FIG. 10]
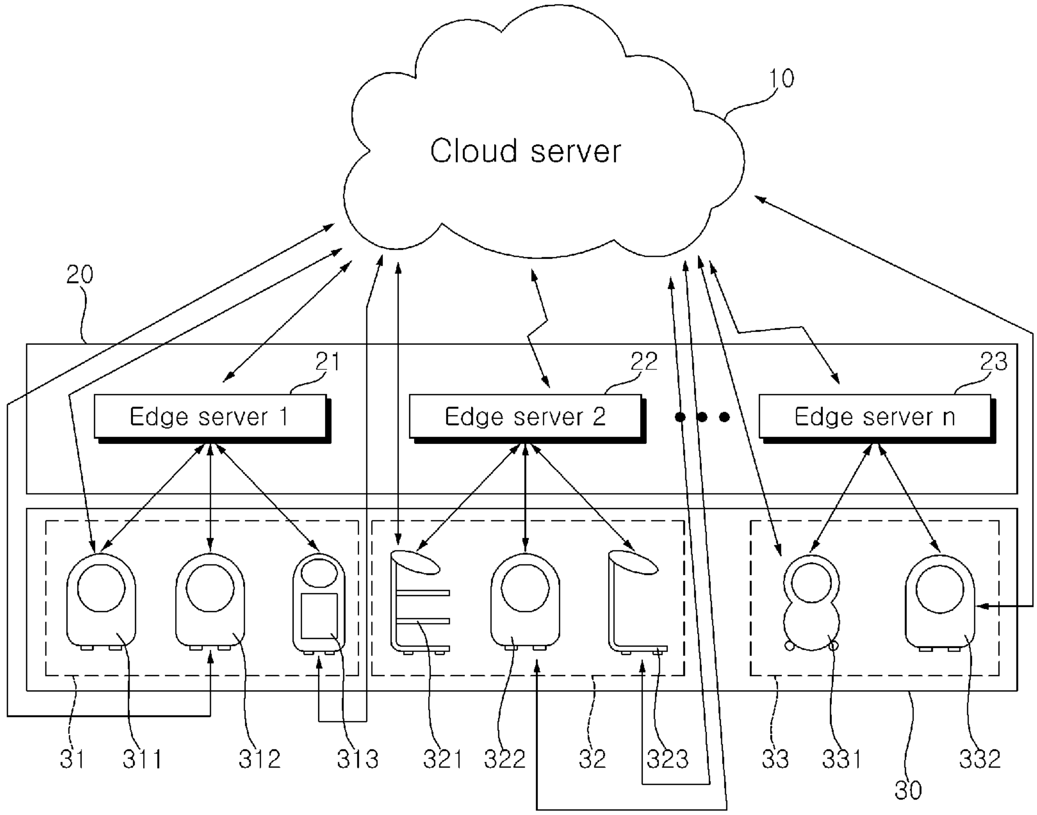

[FIG. 11]
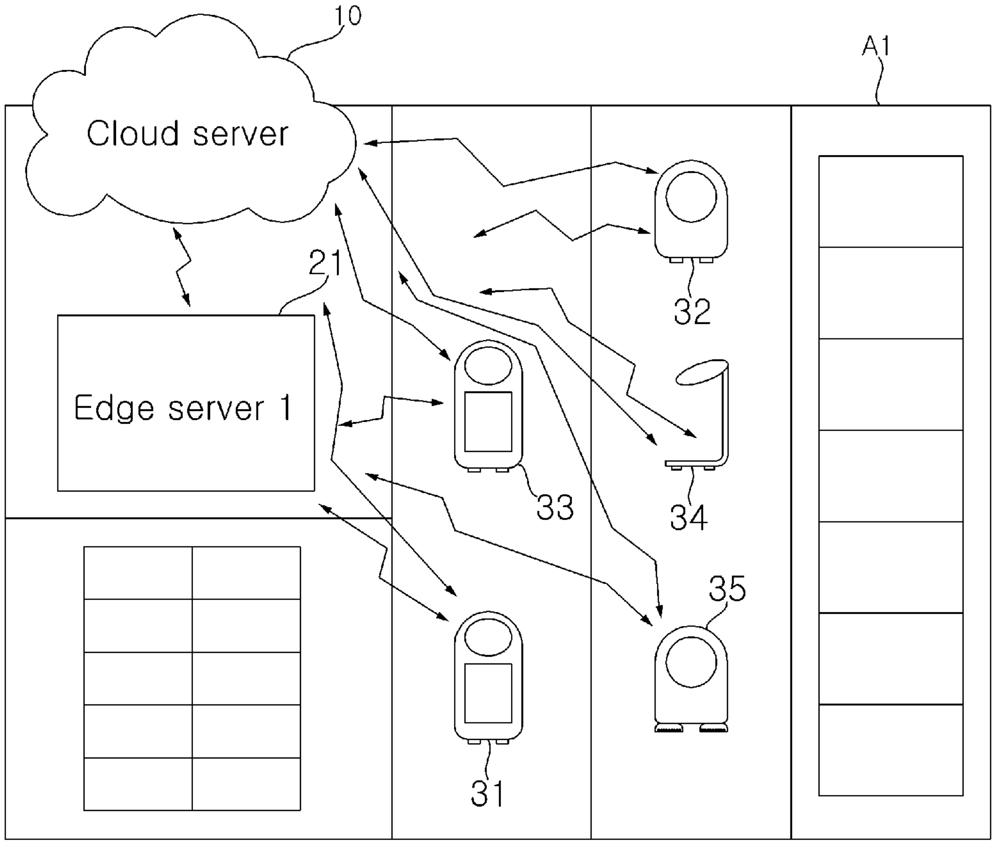

[FIG. 12]
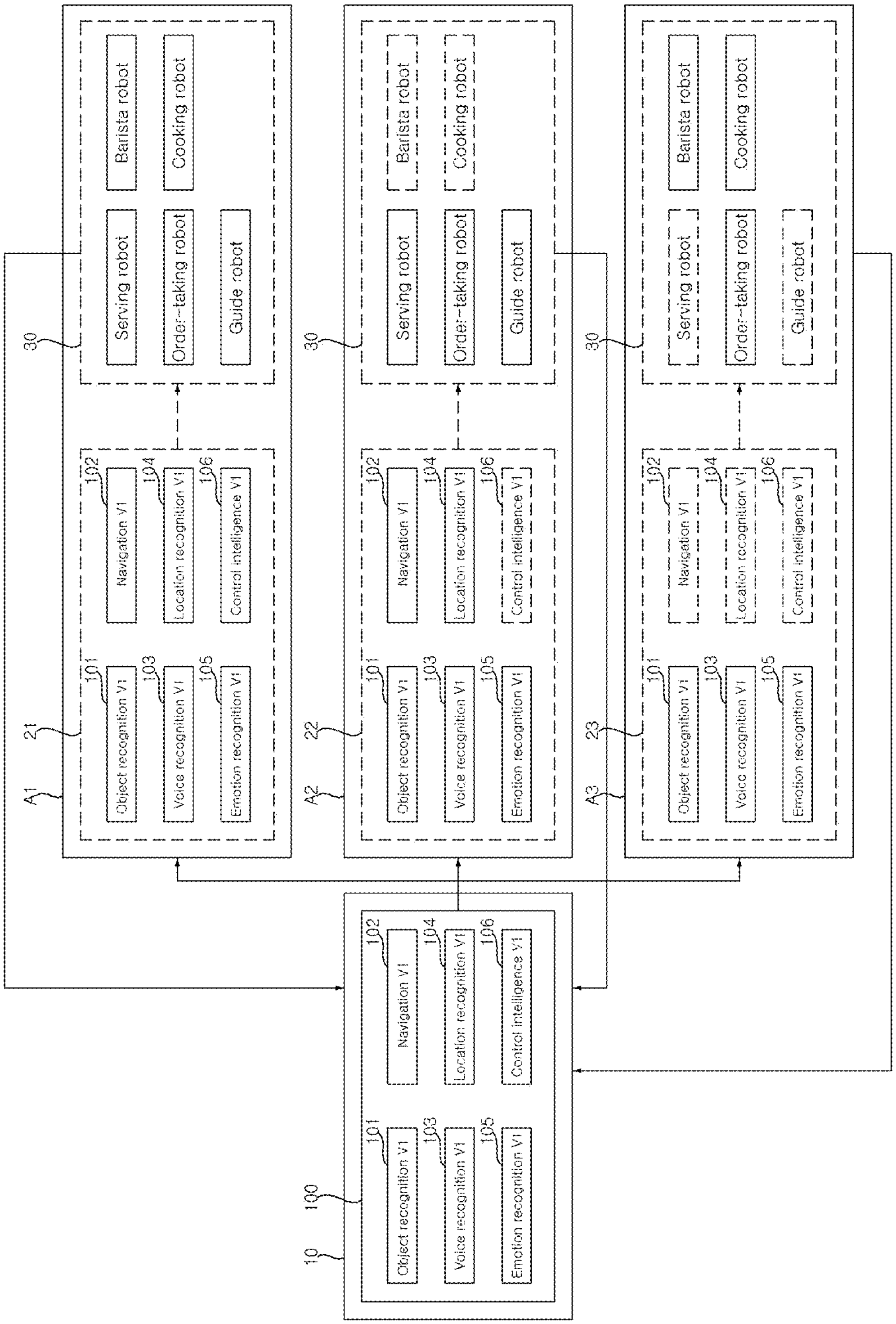

[FIG. 13]
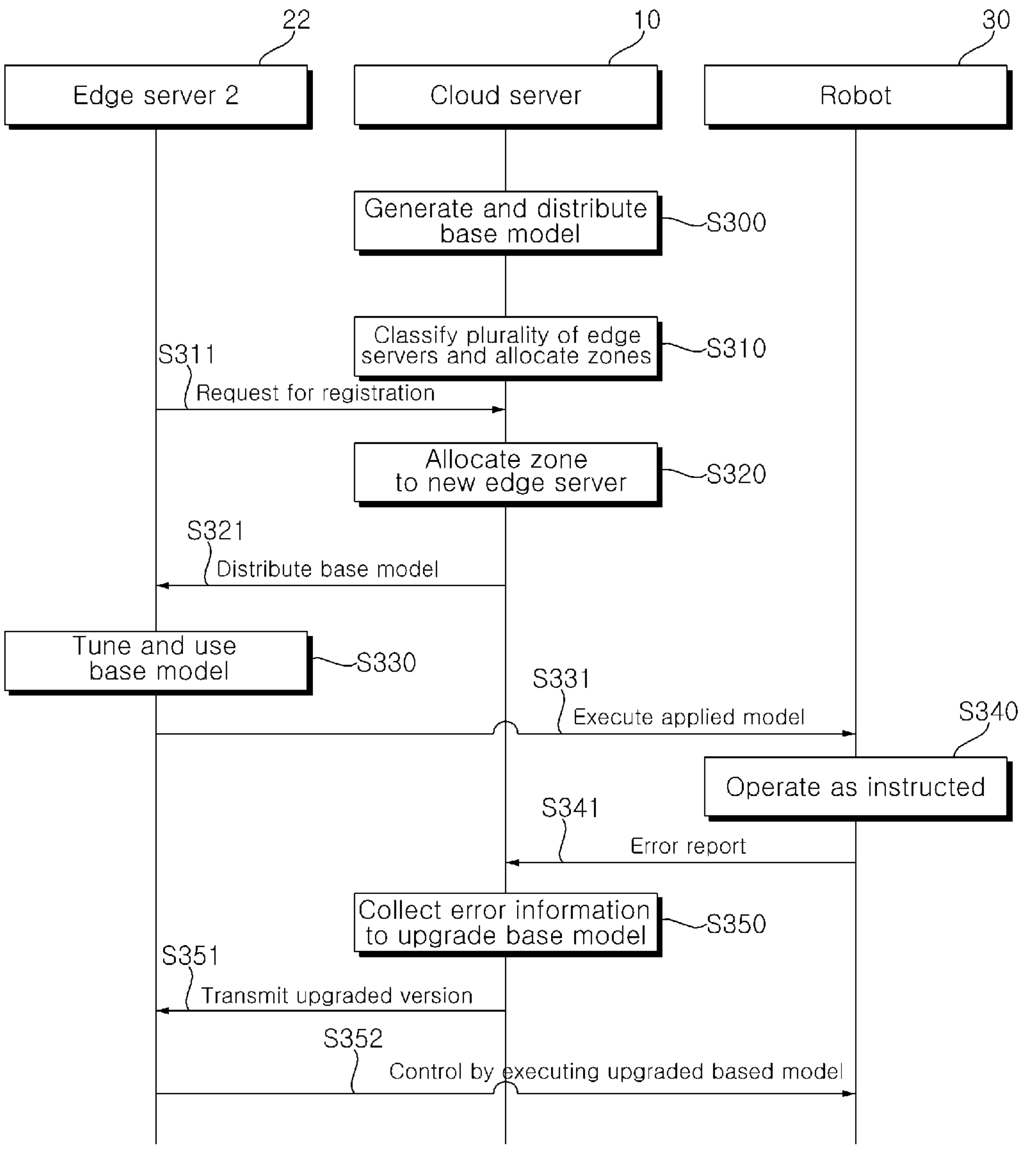

[FIG. 14]
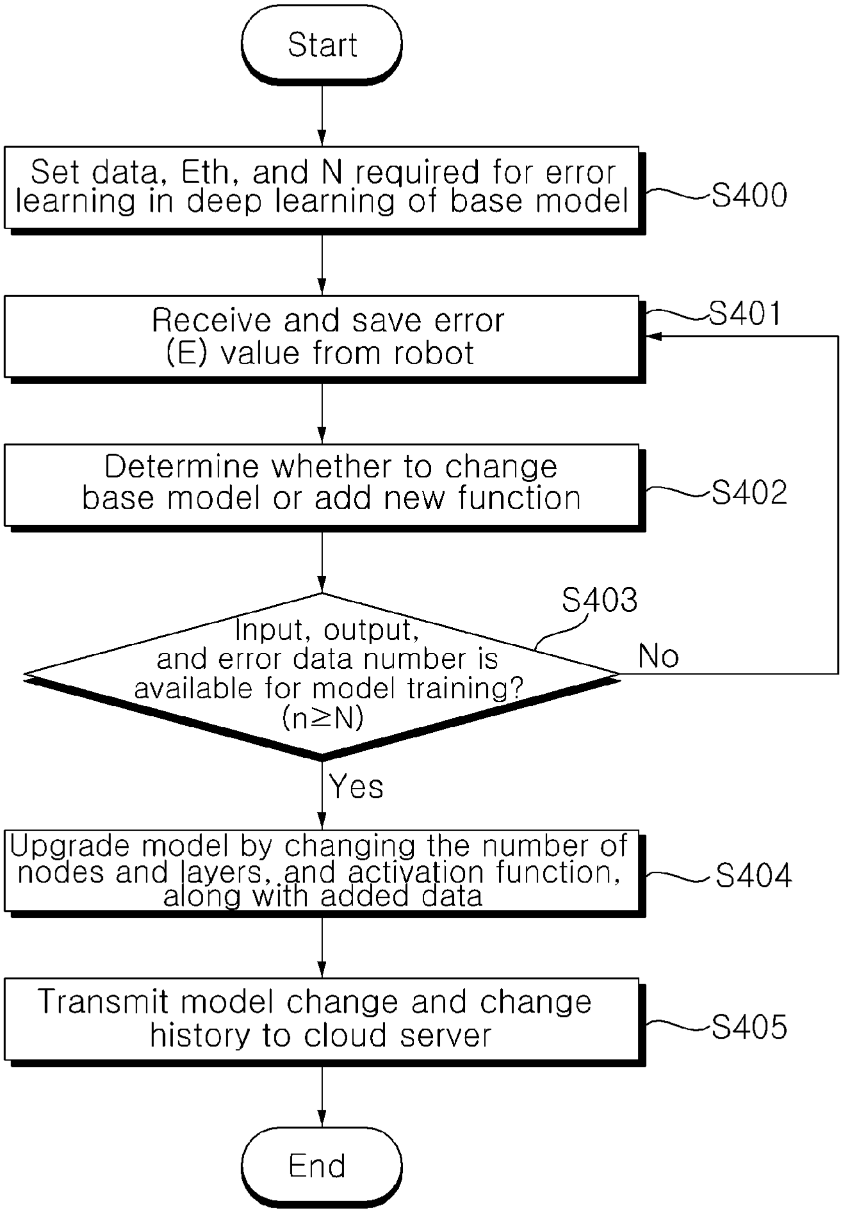

[FIG. 15]
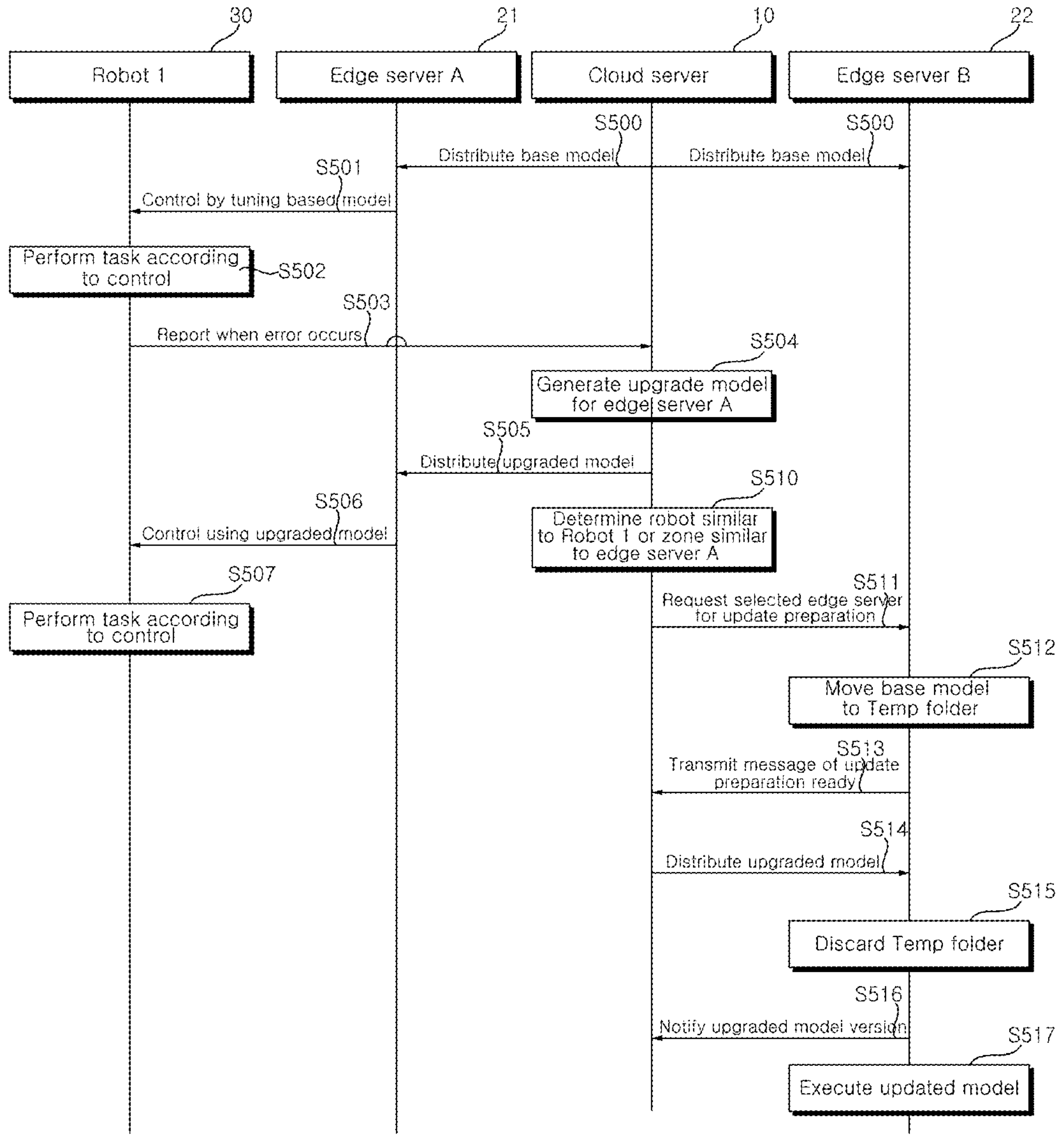

HETEROGENEOUS ROBOT SYSTEM COMPRISING EDGE SERVER AND CLOUD SERVER, AND METHOD FOR CONTROLLING SAME

CROSS-REFERENCE TO RELATED APPLICATION(S)

This application is the National Stage filing under 35 U.S.C. 371 of International Application No. PCT/KR2022/009756, filed on Jul. 6, 2022, which claims the benefit of earlier filing date and right of priority to Korean Application Nos. 10-2021-0096536, filed on Jul. 22, 2021, and 10-2021-0096538, filed on Jul. 22, 2021, the contents of which are all hereby incorporated by reference herein in their entireties.

TECHNICAL FIELD

The present disclosure relates to a robot system including a plurality of edge servers that control heterogeneous robots and a cloud server that communicates with the plurality of edge servers. More particularly, the present disclosure relates to a method for controlling a heterogeneous robot system using a cloud server that provides a base model.

BACKGROUND ART

Robots have been developed for industrial use and have been an integral part of factory automation. Recently, the fields of application of robots have been constantly expanding. As such, medical robots, aerospace robots, and the like have been developed, and home robots that can be used in ordinary houses are also available. Among these robots, a robot that can drive on its own is called an artificial intelligence (AI) robot.

With the increased use of robots, there is a growing demand for robots that can provide various kinds of information, entertainment, and services, in addition to the repetitive performance of simple functions.

Thus, various types of robots are being developed and used in homes, restaurants, shops, public places, and the like to provide convenience to people.

In addition, heterogeneous robot (or robotic) systems are being developed in which different types of robots are deployed in one defined space to perform their respective tasks.

Such a heterogeneous robot system may be defined as the convergence of Information and Communications Technology (ICT) and the existing service industry.

For example, the heterogeneous robot system is defined as a system of processing and communication for various events in a corresponding space based on technologies such as Internet of Things (IoT), big data, cloud computing, and Cyber-Physical System (CPS), etc.

Cloud computing uses Internet technology to provide virtualized ICT resources as a service.

Cloud computing allows users to use ICT resources (e.g., servers, storage, networks, and software) as needed.

Further, users can receive service scalability support in real time depending on the load of the service provided through cloud computing, and pay for the provision of the service.

When a cloud server controls multiple heterogeneous robots through cloud computing, an edge server may be further included for each space to facilitate control or communication.

A robot system including an edge server that controls a plurality of robots in close proximity and a cloud server that communicates with a plurality of edge servers has been developed.

Such a robot system generates a lot of data traffic between the cloud server and the edge server.

U.S. Patent Publication No. 2020-0050951, which is hereby incorporated by reference, discloses that one of edge nodes generates a specification of a machine learning model and distributes the specification to a plurality of edge nodes.

That is, the plurality edge nodes perform machine learning on each other through parameter exchange to update the model.

However, when parameters are exchanged among edge nodes, it is difficult to provide support between heterogeneous robots or heterogeneous services.

In addition, U.S. Patent Publication No. 2019-0079898, which is hereby incorporated by reference, discloses that an edge server performs a specific action by making inferences through a machine learning model, evaluates whether the specific action is correct, and if the specific action is incorrect, the edge server collects and transmits data regarding the specific action to a cloud server, and uses the data collected from the cloud server to train a new machine learning model.

However, in this case, since a large amount of data has to be transmitted and received between the edge server and the cloud server, which is time-consuming and costly, and a new machine learning model has to be trained, which is highly inefficient for the edge server.

Meanwhile, Korean Patent Publication No. 2020-0063340, which is hereby incorporated by reference, discloses that an edge server processes data requiring real-time, and a central processing server processes advanced machine learning and large-scale data. Here, the central processing server converts a general-purpose deep learning neural network to a deep learning neural network of a product similar to a specific product that requires learning, and retrains the converted deep learning neural network as a training data set of the specific product.

However, this is disadvantageous in that a lot of time and processing are required for re-learning.

RELATED ART LITERATURE

- U.S. Patent Publication No. 2020-0050951, published on Feb. 13, 2020
- U.S. Patent Publication No. 2019-0079898, published on Mar. 14, 2019
- Korean Patent Publication No. 2020-0063340, published on Jun. 5, 2020

DISCLOSURE

Technical Problem

It is an objective of the present disclosure to provide a service for efficient intelligence augmentation by enabling sharing of a deep learning model for control of separate heterogeneous robots between edge servers.

It is another objective of the present disclosure to provide a control method using an edge server that tunes a base deep learning model to a customized deep learning model suitable for each robot and upgrades it to an adaptive deep learning model tailored to the service provided by each robot.

It is yet another objective of the present disclosure to provide a control method that enables a deep learning model required for intelligence augmentation to be selected and directly shared between edge servers and allows an edge server to scale up by replacing the existing deep learning model with a shared deep learning model, thereby minimizing processed data passing through a cloud server.

It is yet another objective of the present disclosure to provide a robot system that can be augmented with a service optimized for each local environment by upgrading deep learning models of the respective local environments in which robots are deployed.

It is yet another objective of the present disclosure to provide a robot system that can monitor, by a cloud server, each local environment through each robot to derive a local environment that requires a new function and can add a learning model for the new function to an existing base model.

Technical Solution

According to an aspect of the subject matter described in this application, there is provided cloud-based robot system including: a plurality of robots deployed in a plurality of spaces divided arbitrarily; a cloud server generating a control base model applicable to the plurality of robots; and an edge server that is allocated to each of the spaces, communicates with the cloud server, and receives the control base model, the edge server controlling a plurality of robots in the space based on the control base model.

The plurality of robots may include different types of robots.

The control base model may be packaged with respective control models for a plurality of functions of the different types of robots.

The edge server may receive the control base model, and may execute the control base model by tuning the control base model according to types of the robots controlled by the edge server.

The edge server may perform deep learning error training on the tuned control base model to generate an upgraded control model.

The cloud server may obtain information about the upgraded control model, and may select another edge server to apply the upgraded control model so that the upgraded control model is transmitted directly from the edge server to the selected edge server.

The cloud server may select the edge server including server including a robot to which the upgraded control model is to be applied, so as to transmit the upgraded control model.

When an error value exceeding a threshold value occurs a predetermined number or more while executing the control base model, the edge server may generate the upgraded control model by performing the deep learning error training.

The cloud server may classify a plurality of edge servers to manage the plurality of edge servers into a plurality of groups.

One group of the plurality of groups may be located within a predetermined distance or a predetermined response time.

According to another aspect, there is provided a cloud-based robot control method for controlling a plurality of robots that are deployed in a plurality of spaces divided arbitrarily, the method including: generating, by a cloud server, a control base model applicable to the plurality of robots; disturbing the control base model to an edge server allocated to each of the spaces; upgrading, by the edge server, the control base model according to a plurality of robots in the space; and controlling, by the edge server, the plurality of robots using the upgraded control model.

The plurality of robots may include different types of robots.

The generating of the control base model may include generating and packaging respective control models for a plurality of functions of the different types of robots.

The method may further include receiving, by the edge server, the control base model to tune the control base model according to types of the robots controlled by the edge server.

The upgrading of the control base model may include generating performing deep learning error training on the tuned control base model.

The method may further include: obtaining, by the cloud server, information about the upgraded control model; selecting another edge server to apply the upgraded control model; transmitting information of the selected another edge server to an edge server where an upgrade is performed; and transmitting the upgraded control model directly from the edge server where the upgrade is performed to the selected another edge server.

The selecting of the another edge server may include selecting an edge server including a robot to which the upgraded control model is to be applied.

The upgrading of the control base model includes generating the upgraded control model by performing the deep learning error training when an error value exceeding a threshold value occurs a predetermined number or more while the edge server executes the control base model.

The method may further include classifying and grouping, by the cloud server, a plurality of edge servers.

One group may be located within a predetermined distance or a predetermined response time.

Advantageous Effects

According to the embodiments of the present disclosure, it possible to support heterogeneous robots and heterogeneous services by sharing a deep learning model among edge servers.

As an edge server tunes a base deep learning model from a cloud server to a customized deep learning model suitable for each robot and upgrades it to an adaptive deep learning model tailored to the service provided by each robot, it is possible to provide optimized services.

As a deep learning model required for intelligence augmentation is selected and directly shared among edge servers, and an edge sever replaces the existing deep learning model with a shared deep learning model to scale up, it is possible to minimize processed data passing through the cloud server.

In addition, an efficient growth of knowledge can be achieved by updating and training the existing deep learning model with a shared deep learning model of another edge server, based on one base model from the cloud server.

Further, as deep learning models of the respective local environments in which robots are deployed, it is possible to provide a service optimized for each local environment. Specifically, the cloud server can monitor each local environment through each robot to derive a local environment that requires a new function, and can add a learning model for the new function to an existing base model.

BRIEF DESCRIPTION OF DRAWINGS

FIG. 1 is a schematic diagram illustrating a cloud and edge-based environment according to an embodiment of the present disclosure.

FIG. 2 is a conceptual diagram illustrating the zone classification of a cloud server of the present disclosure.

FIG. 3 is a detailed diagram for explaining a heterogeneous robot system based on one edge server of the present disclosure.

FIG. 4 is a configuration diagram illustrating an example of the application of the cloud server or edge server of FIG. 3.

FIG. 5 is a conceptual diagram illustrating modeling of cloud and edge servers, according to an embodiment of the present disclosure.

FIG. 6 is an overall flowchart of a robot cloud system of the present disclosure.

FIG. 7 is a detailed flow chart illustrating a method of one edge server entering the system of FIG. 6.

FIG. 8 is a flowchart illustrating that the one edge server of FIG. 6 upgrades a base model.

FIG. 9 is a flowchart illustrating a method for sharing an upgraded model of another edge server, according to an embodiment of the present disclosure.

FIG. 10 is a schematic diagram illustrating a cloud and edge-based environment according to another embodiment of the present disclosure.

FIG. 11 is a detailed diagram for explaining a heterogeneous robot system based on one edge server in the environment of FIG. 10.

FIG. 12 is a conceptual diagram illustrating modeling of a cloud server, an edge server and a robot, according to another embodiment of the present disclosure.

FIG. 13 is an overall flowchart of a robot cloud system of FIG. 12.

FIG. 14 is a flowchart illustrating that the cloud server of FIG. 13 upgrades a base model for one edge server.

FIG. 15 is a flowchart illustrating a method of sharing an upgraded model to another edge server, according to another embodiment of the present disclosure.

MODE FOR THE INVENTION

Throughout the descriptions set forth herein, expressions indicating directions, such as front (F), rear (R), left (Le), right (Ri), up (U), and down (D), are defined as indicated in the drawings, and are used only to facilitate the understanding of the present disclosure. Each direction may be defined differently according to a reference point.

The use of terms, in front of which adjectives such as "first", "second", and "third" are used to describe constituent elements mentioned below, is intended only to avoid confusion of the constituent elements, and is unrelated to the order, importance, or relationship between the constituent elements. For example, an embodiment including only a second component but lacking a first component is also feasible.

In the drawings, the thickness or size of each element is exaggerated, omitted, or schematically illustrated for the convenience of description and clarity. In addition, the size or area of each element does not necessarily reflect the actual size thereof.

In addition, angles or directions used to describe the structures of the present disclosure are based on those shown in the drawings. If the reference point of an angle or angular positional relations in the structures of the present disclosure are not clearly specified, the related drawings may be referred to.

FIG. 1 is a schematic diagram illustrating a cloud and edge-based environment according to an embodiment of the present disclosure, FIG. 2 is a conceptual diagram illustrating the zone classification of a cloud server of the present disclosure, and FIG. 3 is a detailed diagram for explaining a heterogeneous robot system based on one edge server of the present disclosure.

Referring to FIG. 1, a cloud-based robot system according to an embodiment of the present disclosure may include a cloud server 10, a plurality of edge servers 20, and a plurality of robots 30.

The cloud-based robot system integrally manages and controls the plurality of robots 30 distributed in different spaces that are separated from each other.

Here, each space is functionally or geographically separated, and an edge server 20 is set up in each space to control a plurality of robots 30 disposed in each space.

In each space, robots 30 of the same type may be deployed, or, alternatively, robots 30 of different types may be deployed.

For example, in a space 1 (A1), an edge server 1 (21) may be set up, and one order-taking robot 313 and two guide robots 311 and 312 may be deployed. Meanwhile, in a space 2, an edge server 2 (22) may be set up, and two delivery (or serving) robots 321 and 323 and one guide robot 322 may be deployed. Meanwhile, in a space 3, an edge server n (23) may be set up, and one entertainment robot 331 and one guide robot 332 may be deployed.

The heterogeneous or homogeneous robots 30 deployed in each space may communicate with the edge server 20 set up in the corresponding space, and may interact with users in home or business environment to provide assigned services.

Preferably, the cloud robot system according to an embodiment of the present disclosure includes a plurality of heterogeneous robots 30 and an edge server 20, which are set up in each space, and a cloud server 10 that communicates with each of the edge servers 20 to provide the integrated management.

The edge server 20 may remotely monitor and control the state (or status) of the plurality of robots 30, allowing the cloud robot system to provide more effective services using the plurality of robots 30.

The plurality of heterogeneous robots 30, the edge server 20, and the cloud server 10 may each have a communication means (not shown) that supports one or more communication standards, so as to communicate with each other.

For example, the plurality of heterogeneous robots 30, the edge server 20, and the cloud server 10 may be configured to communicate wirelessly using wireless communication technologies such as IEEE 802.11 WLAN, IEEE 802.15 WPAN, UWB, Wi-Fi, Zigbee, Z-wave, Blue-Tooth, etc. The robot 30 may vary depending on the communication method of other devices or servers (2) with which it wants to communicate.

In particular, the plurality of robots 30 may perform wireless communication with other robots 30 and/or the edge server 20 and the cloud server 10 over a 5G network. When the robots 30 wirelessly communicate over the 5G network, an ultra-low latency/ultra-high-capacity data transmission network may be achieved.

More specifically, a 5G network is a communication technology that provides a transmission speed of several tens of Gbps in the wireless section, and enables transmission of ultra-low-latency/ultra-high-capacity/ultra-realistic data in multiple modules at a speed of Gbps or higher and ultra-low-latency data transmission in msec, in response to service-specific quality requirements. The 5G network can provide network quality comparable to high-speed wired networks, while providing the advantage of being wireless.

Such a 5G network may allow a cloud machine learning/deep learning-based robot system to provide various services optimized for each of the heterogeneous robots 30, between the robot 30 and the edge server 20 and between the edge server 20 and the cloud server 10.

In addition, the plurality of robots 30 and the edge server 20 may communicate using, but are not limited to, a message queuing telemetry transport (MQTT) protocol and a hypertext transfer protocol (HTTP).

In some cases, the plurality of robots 30, the edge server 20, and the cloud server 10 may support two or more communication standards, and an optimal communication standard may be used depending on the type of communication data and the type of devices participating in the communication.

A user may check information about the robots 30 in the robot system while transmitting and receiving data to and from the edge server 20.

As used herein, the term "user" is a person who uses the services provided by the plurality of robots 30, and may include individual customers who purchase or rent the robots 30 to use the robots 30 at their place of business, managers and employees of businesses that use the robots 30 to provide services to their employees or customers, and customers who use the services provided by these businesses. Therefore, the term "user" may include individual customers (Business to Consumer: B2C) and corporate customers (Business to Business: B2B).

The cloud server 10 designs/generates a model for controlling a plurality of physically dispersed robots 30, and then distributes the model to the edge server 20 set up in each space.

Specifically, the cloud server 10 generates a model or engine in the cloud (10). In the environment of a heterogeneous robot system, a general-purpose model or a general-purpose engine applied to the heterogeneous robots 30 is a base model, and is not designed as a specific model for a particular situation.

The cloud server 10 may package by generating a plurality of functionally or structurally distinct models or engines for the plurality of heterogeneous robots 30, respectively, and may perform complex machine learning/deep learning that is difficult to implement in the edge server 20.

Machine learning, which is a branch of artificial intelligence (A1), refers to a technology that generates models that can generalize, classify, and evaluate numerous data based on algorithms and techniques that enable computers to learn on their own.

By generating such a base model and distributing it to the plurality of edge servers 20, it is possible to control the plurality of physically separated heterogeneous robots 30.

In addition, the cloud server 10 may classify and group the plurality of edge servers 20 into zones, so that the edge servers 20 grouped by zone may be managed by group.

In this case, the zones to be grouped may be set according to the physical distance or response time from the cloud server 10 to the edge server 20.

As shown in FIG. 2, a plurality of edge servers 21 and 22 within a first distance d1 or a first response time from the cloud server 10 may be classified as a first zone z1, a plurality of edge servers 23, 24, and 25 within a second distance d2 greater than the first distance d1 or a second response time greater than the first response time may be classified as a second zone z2, and other edge servers 26 and 27 within a third distance d3 or a third response time may be classified as a third zone z3.

In this case, the distance among the first distance d1, the second distance d2, and the third distance d3 may be equal to each other, but the present disclosure is not limited thereto.

In addition, the difference between the first to third response times may be equal to each other, but the present disclosure is not limited thereto. Here, the response time may be defined as the number of network nodes until the arrival of the packet or the response time via ping, but the present disclosure is not limited thereto.

As the plurality of edge servers 20 are classified by zones, it may be usefully applicable to modeling distribution scheduling of each of the edge servers 20 in the cloud server 10.

An edge server 20 is set up in each space, as shown in FIG. 3, to control each robot 30 by tuning and upgrading the base model to an adaptive model to be suitable for a plurality of heterogeneous or homogeneous robots 30 deployed in the corresponding space.

A typical edge server (20) is a technology that processes data at the edge where the data is generated, rather than processing data in the cloud server 10, and is implemented to process data that requires real-time (processing) in the edge server 20 and communicate with the central cloud as a secondary operation when necessary.

However, in the present disclosure, the cloud server 10 performs base deep learning modeling, which is a general-purpose model or engine for heterogeneous robots 30 and services, and the edge server 20 receives the base model and tunes it to be suitable for the corresponding space to provide services with an adaptive deep learning model.

Specifically, by using training data of the corresponding space previously collected from the various plurality of robots 30, the edge server 20 executes after upgrading a base deep learning model received from the cloud server 10 to be customized and suitable for each robot 30 and service.

In this case, the edge server 20 may also consider various types of environmental information about the corresponding space, so as to upgrade the base deep learning model to an optimal customized deep learning model.

In addition, upon providing services, the edge server 20 may transmit feedback (errors, performance information, etc.) from the plurality of heterogeneous robots 30 to the cloud server 10, and may share the upgraded model to another edge server 20. Once the upgraded model is shared to another edge server 20, the another edge server 20 may remove its existing model, update it to the shared model, and may tune and execute it to be suitable for the robots 30 in the space.

As shown in FIG. 3, one edge server 20 is disposed in a distinct virtual space or physically separate space A1, and controls a plurality of robots 30, which are deployed in the space A1 to provide services, and the services provided by the robots 30.

In one example, as shown in FIG. 3, an edge server 21 may control a plurality of robots 30 (31, 32, 33, 34, 35) that provide services in a smart restaurant, and the plurality of robots 30 may include a guide robot, an order-taking robot, a serving robot, an entertainment robot, a cleaning or cooking robot, a barista robot, etc.

As such, the plurality of heterogeneous robots 30 deployed in the space A1 are subordinate to the corresponding edge server 21 and provide services while transmitting and receiving data.

The cloud server 10 or the edge server 21 may generally have the similar configuration.

FIG. 4 is a configuration diagram illustrating an example of the application of the cloud server or edge server of FIG. 3.

Referring to FIG. 4, the edge server 20 or the cloud server 10 may include a memory or computing data collection database 110, a controller 100, and a communication unit 120.

Specifically, the cloud server 10 or the edge server 20 may be configured as at least one computing device consisting of a memory and a processor that reads a program stored in the memory to perform a specific function.

As for the edge server 20, the memory 110 may store and manage data obtained based on IoT technology from a plurality of heterogeneous or heterogeneous robots 30 in the space, and may store a base deep learning model received from the cloud server 10.

As for the cloud server 10, the memory 110 may store an algorithm that can perform processing for base deep learning.

In addition, the memory 110 may store at least one of application programs, data, and commands required for the operation of functions according to embodiments of the present disclosure.

Such a memory 110 may be any of various storage devices such as ROM, RAM, EPROM, flash drive, hard drive, and the like, and may be a web storage that performs the storage function of the memory 110 on the Internet.

In some embodiments, software components stored in the memory 110 may include an operating system, a communication module (or set of instructions), a contact/motion module (or set of instructions), a graphics module (or set of instructions), a text input module (or set of instructions), a global positioning system (GPS) module (or set of instructions), and applications (or set of instructions).

The processor 100 of the edge server 20 may control the overall operation of the plurality of robots 30 to operate the same.

The processor 100 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electrical units for performing other functions.

The processor 100 of the edge server 20 may analyze various data obtained from the plurality of robots 30 to perform appropriate processing, and may perform machine learning/deep learning on its own to learn to upgrade a corresponding base deep learning model.

Based on the data received from the robots 30, data input by a user, and the like, the edge server 20 may perform machine learning/deep learning, and then may transmit upgraded data to the robots 30. This allows the control program of the robots 30 to be updated.

The processor 100 of the edge server 20 may analyze each of the data obtained from the plurality of robots 30, and may apply each analyzed data to the corresponding model or engine.

The processor 100 of the cloud server 10 may have a more advanced processor capable of performing machine learning/deep learning.

Meanwhile, the cloud server 10 or the edge server 20 may include the communication unit 120, and as described above, various communications are possible according to the communication method required in the environment. In particular, communication between the robot 30 and the edge server 20, between the edge server 20 and cloud server 10, and between edge servers 20 may be achieved using a 5G network, and the algorithm itself of large-scale deep learning modeling may be transmitted and received.

Meanwhile, various heterogeneous or homogeneous robots 30 deployed in each space may transmit data regarding space, objects, and usage to the edge server 20.

Here, the data regarding space and objects may be data related to the recognition of the space and objects recognized by the robot 30, or image data regarding the space and objects acquired by an image acquisition unit.

In some embodiments, the robot 30 and the edge server 20 may include artificial neural networks (ANNs) in the form of software or hardware trained to recognize at least one of the attributes of objects such as users, voice, the properties of space, obstacles, and the like.

According to an embodiment of the present disclosure, the cloud server 10 and the edge server 20 may include a deep neural network (DNN), such as a convolutional neural network (CNN), a recurrent neural network (RNN), or a deep belief network (DBN) trained by deep learning. For example, the processor of the edge server 20 may be equipped with a deep neural network (DNN) structure such as a convolutional neural network (CNN).

In addition, the data regarding usage is data obtained by the use of the robot 30, and may correspond to usage history data, a detection signal acquired by a sensor unit 110, and the like.

A trained deep neural network (DNN) structure may receive input data for recognition, and the robot 30 may recognize the attributes of people, objects, and spaces contained in the input data and output the results.

In addition, the trained deep neural network (DNN) structure may receive input data for recognition, and may analyze and learn data related to the usage of the robot 30 to recognize a usage pattern, a usage environment, and the like.

Meanwhile, the data regarding space, objects, and usage may be transmitted to the edge server 20 through a communication unit of the robot 30.

The edge server 20 may train a deep neural network (DNN) based on the received data, and then may transmit updated deep neural network (DNN) structure data to the corresponding robot 30 for updating.

The robot 30 according to an embodiment of the present disclosure may be a mobile robot 30 that travels in the space and performs a set service or task.

Such a robot 30 may include a controller configured to control the overall operation, a storage unit configured to store various data, and a communication unit configured to transmit and receive data to and from other devices such as the edge server 20, and the like.

The controller may control the communication unit and various sensors in the robot 30 to control the overall operation of the robot 30.

The communication unit may include at least one communication module, so that an artificial intelligence robot 30 is connected to the Internet or a predetermined network and communicates with other devices.

In addition, the communication unit may be connected to a communication module provided in the edge server 20 so as to process data transmission and reception between the robot 30 and the edge server 20.

The robot 30 according to an embodiment of the present disclosure may further include a voice input unit configured to receive a voice input from a user through a microphone.

The voice input unit may include or be connected to a processing unit that converts analog sound into digital data, so as to convert a user input voice signal into data to be recognized by the controller or the edge server 20.

Meanwhile, the controller may control the robot 30 to perform a predetermined operation based on the voice recognition result.

Meanwhile, the robot 30 may include various modules that display predetermined information as an image or output sound, according to the type.

The robot 30 may include a display configured to display information corresponding to a command input, a processing result corresponding to a user's command input, an operation mode, an operation state, an error state, and the like as images.

In some embodiments, at least a portion of the display may be configured as a touch screen in an interlayer structure with a touch pad. In this case, the display configured as a touch screen may be used as an input device for inputting information by a user's touch, in addition to an output device.

In addition, an audio output unit may output a warning sound, a notification message regarding operation mode, operation state, or error state, information corresponding to a user's command input, a processing result corresponding to a user's command input, and the like as sound, under the control of the controller. The audio output unit may convert an electrical signal from the controller into an audio signal to output the audio signal. To this end, a speaker or the like may be provided.

In some embodiments, the robot 30 may further include an image acquisition unit configured to capture a predetermined range.

The image acquisition unit may include a camera module to capture images of the surroundings of the artificial intelligence robot 30, the external environment, and the like. Multiple camera modules may be installed in each part to increase the efficiency of image capturing.

The image acquisition unit may capture an image for user recognition. The controller may determine an external situation or recognize a user (a guide target) based on the image acquired by the image acquisition unit.

In addition, when the robot 30 is an artificial intelligence robot 30, the controller may control the robot 30 to travel based on the image captured and acquired by the image acquisition unit.

The robot 30 may further include a drive unit for movement, and the drive unit may cause a main body to move, under the control of the controller.

The drive unit may be disposed in a driving unit of the robot 30 and may include at least one driving wheel (not shown) to allow the main body to travel. The drive unit may include a drive motor (not shown) connected to the driving wheel to rotate the driving wheel. Driving wheels may be respectively provided at the left and right sides of the main body, which are hereinafter referred to as a left wheel and a right wheel, respectively.

The left wheel and the right wheel may be driven by a single drive motor. However, a left wheel drive motor for driving the left wheel and a right wheel drive motor for driving the right wheel may be provided, as necessary. A traveling direction of the main body may be switched to the left or right by varying the rotational speed of the left wheel and the right wheel.

Meanwhile, the robot 30 may include a sensor unit including sensors configured to sense various data related to the operation and the state of the robot 30.

The sensor unit may further include a motion detection sensor that detects motion of the robot 30 and outputs motion information. For example, a gyro sensor, a wheel sensor, an acceleration sensor, or the like may be used as the motion detection sensor.

The sensor unit may include an obstacle detection sensor configured to detect an obstacle. The obstacle detection sensor may include an infrared sensor, an ultrasonic sensor, an RF sensor, a geomagnetic sensor, a position sensitive device (PSD) sensor, a cliff sensor that detects the absence or presence of a cliff on the floor in the traveling area, light detection and ranging (LiDAR), and the like.

Meanwhile, the obstacle detection sensor detects an object, in particular an obstacle, present in the traveling (moving) direction of the artificial intelligence robot 30 to transmit obstacle information to the controller. In this case, the controller may control the movement of the robot 30 based on the position of the detected obstacle.

Meanwhile, the controller may control such that the operating state of the artificial intelligence robot 30 or a user input is transmitted to the edge server 20 or the like through the communication unit.

Robots 30 assigned with specific tasks, such a serving robot, an order-taking robot, and a guide robot, may be deployed in one space, and may have a separate work section corresponding to each task, as shown in FIG. 3.

Each of the robots 30 may be controlled by the edge server 20 according to the assigned task.

Hereinafter, control of the robot system including heterogeneous robots 30 will be described in detail with reference to FIGS. 5 to 7.

FIG. 5 is a conceptual diagram illustrating modeling of cloud and edge servers, according to an embodiment of the present disclosure, FIG. 6 is an overall flowchart of a robot cloud system of the present disclosure, and FIG. 7 is a detailed flow chart illustrating a method of one edge server entering the system of FIG. 6.

Referring to FIG. 6, a robot cloud system according to an embodiment of the present disclosure is configured such that model generation/distribution/sharing is made between a plurality of edge servers 20 in communication with the cloud server 10.

In detail, the cloud server 10 generates a base model that can be universally applied to all robots 30 under the control of the cloud server 10, namely, robots 30 that are controlled by the cloud server 10 or connected to the cloud server 10 to store information, or robots 30 that are connected to the edge server 20 (S10).

First, the cloud server 10 performs machine learning/deep learning in the processor 100 to generate a model that can be universally used for control of a plurality of heterogeneous robots 30.

When the heterogeneous robots 30 controlled through the edge server 20 that communicates with the cloud server 10 are a serving robot, a barista robot, an order-taking robot, a cooking robot, and a guide robot, as shown in FIG. 5, an object recognition model 101, a navigation model 102, a voice recognition model 103, a location recognition model 104, an emotion recognition model 105, a control intelligence model 106, and the like may be generated as models that can be selectively used for the respective robots 30.

The model (101 to 106) is selectively applicable to a specific robot 30, and the cloud server 10 generates all models 101 to 106 required as the concept of union.

This respective deep learning modeling provides a general-purpose, packaged base model to the edge servers 20, and each edge server 20 is trained through an optimizing process by tuning/upgrading based on its environment and robot 30.

Specifically, the cloud server 10 generates a packaged base model and distributes the packaged base model to each registered edge server 20 (S10).

Meanwhile, the cloud server 10 proceeds with grouping to register a plurality of edge servers 20 and categorize them into specific zones (S20).

As shown in FIG. 7, zones are set according to the distance or response time of each registered edge server 20, and the cloud server 10 transmits information about zones allocated to a plurality of edge servers 20 in the same zone and information about other edge servers 20 registered in the same zone (S100).

In this case, when a service registration request is received from a new edge server 22, the cloud server 10 performs zone allocation for the new edge server 22 (S101).

That is, the cloud server 10 uses an IP address of the new edge server 22 to determines a physical location of the edge server 22, and measures a response time via ping or traceroute (S102).

The cloud server 10 allocates the new edge server 20 to a specific zone by reading a distance from the cloud server 10 based on the response time or physical location (S103).

The cloud server 10 transmits information about the zone allocation, for example, a range of the zone, and other edge servers 21, 23, . . . registered in the zone to the new edge server 22 (S104). The cloud server 10 also transmits information that the new edge server 22 has been registered to the other edge servers 21, 23, . . . in the zone (S105).

Referring back to FIG. 6, the cloud server 10 distributes the packaged base model to a registered new edge server 22 (S31).

Here, the distributed base model is the packaging of models or modules related to various functions for managing or controlling various heterogeneous robots 30, and an application program for upgrading or tuning the base model may also be distributed when the base model is transmitted.

Upon receiving the base model, the new edge server 22 tunes it to be suitable for the plurality of heterogeneous robots 30 controlled by the new edge server 22 (S40).

When the new edge server 22 controls only a serving robot 30, an order-taking robot 30, and a guide robot 30, as shown in FIG. 5, the tuning may be performed such that, of the received base model, a control intelligence model is not activated and other models, namely, an object recognition model 101, a navigation model 102, a voice recognition model 103, a location recognition model 104, and an emotion recognition model 105 are only activated.

That is, tuning is defined as a process of activating only necessary models in each area and storing unnecessary models in an inactive state.

As the new edge server 22 selects and activates only the models required for the heterogeneous robots 30 in a zone A2, computational programs may be reduced to thereby reduce cost and time.

For example, in the case of a first edge server 21 of FIG. 5, when a serving robot, a barista robot, an order-taking robot, a cooking robot, and a guide robot are deployed in a zone A1, all models packaged as a base model may be activated.

When there are only a barista robot, an order-taking robot, and a cooking robot, the movement of the robots is not required, and thus, a third edge server 23 may control without activating a navigation model 102, a location recognition model 104, and the like.

Next, the edge server 20 may execute the tuned base model to perform control of the respective heterogeneous robots 30, and may upgrade each base model when a predetermined amount of data is obtained (S50).

The upgrade of the base model will be described in detail later with reference to FIGS. 8 and 9.

When one edge server 20 upgrades the base model, the edge server 20 transmits corresponding upgrade information to the cloud server 10 (S61).

The cloud server 10 receives the upgrade information, selects (or identifies) an edge server 20 that needs the upgraded base model, and transmits information about the selected edge server 20 to the edge server 20 (S62).

The edge server 20 transmits the upgraded base model to the selected edge server 20, thereby sharing the upgraded base model with other edge servers 20 (S63).

In this case, upon receiving the upgraded base model, the selected edge server 20 may delete its previous base model and may convert and update it to the upgraded base model so as to control the robots 30 in the allocated area (S70).

As the control system of heterogeneous robots 30 using the cloud server 10 of the present disclosure includes an edge server 20 for controlling robots 30 at a distance, and each edge server 20 uses a base model, provided by the cloud server 10, with appropriate tuning, and upgrades the base model by performing machine learning/deep learning.

The base model upgraded by any of the edge servers 20 to be specific for its environment may be directly transmitted to another edge server 20 necessary for the upgrade.

As such, an upgraded base model is directly transmitted and received from one edge server 20 to another edge server 20 necessary for the upgrade, rather than being transmitted and received through the cloud server 10, unnecessary traffic may be reduced, thereby sufficiently securing a storage space of the cloud server 10.

Hereinafter, a base model upgrade by each edge server 20 and sharing of the upgraded base model will be described with reference to FIGS. 8 and 9.

FIG. 8 is a flowchart illustrating that the one edge server of FIG. 6 upgrades a base model, and FIG. 9 is a flowchart illustrating a method for sharing an upgraded model of another edge server, according to an embodiment of the present disclosure.

First, referring to FIG. 8, when one edge server 20 receives a grouped base model from the cloud server 10, the edge server 20 tunes the base model to be suitable for a plurality of heterogeneous robots 30 controlled by the edge server 20.

For example, when all models are required, as in the case of the first edge server 21 of FIG. 5, the base mode may be used without additional tuning. Alternatively, the base model may be tuned by inactivating the control intelligence model as in the case of the second edge server 22.

When a plurality of robots 30 are controlled by using the tuned base model, a threshold value and minimum data number for deep learning error training are set (S51).

Specifically, a threshold value Eth and a minimum data number N may be set.

The threshold value Eth may be defined as a reference value for selecting values classified as error values among the values received for respective base models, and the minimum data number N may be defined as the minimum data number available for training the deep learning model.

Here, the threshold value Eth and the minimum data number N may be set differently for each model.

Next, the edge server 20 uses all of the respective models to control the plurality of heterogeneous robots 30 (S52).

In this case, an input value transmitted from the edge server 20 to each robot 30 and an output value and an error value E output from each robot 30 are received.

The input value, the output value, and the error value E may be received whenever each service or function progresses, and may be received whenever an event occurs.

The edge server 20 compares each error value E with the threshold value Eth for one model (S53).

When the error value E is greater than the threshold value Eth, it is determined to be true and is saved as training data, and the data number (n=n+1) is counted (S54).

When the counted data number does not satisfy the minimum data number N while continuously determining whether the error value E for the data is greater than the threshold value Eth, the edge server 20 reads the next data and determines whether an error value E is true or false again. When the data number of an error value exceeding the threshold value Eth satisfies the minimum data number N, it is determined that deep learning model training is available, so that an upgrade through deep learning training of the corresponding model is performed (S55).

In this case, the edge server 20 may perform the upgrade by changing the number of nodes, the number of layers, and activation function values along with the added error values. Here, the activation function may be used by storing a plurality of candidate groups in advance (S56).

In one example, while applying a corresponding voice recognition model, when an error value exceeding a minimum data value occurs, it may be programmed to minimize the error by applying another activation function.

The upgraded model may be stored in the memory 101 of the edge server 20 as version 2 (V2), and may be used as a replacement for the previous version of version 1 (V1).

When a change is made in the upgraded model, the edge server 20 transmits the change to the cloud server 10 and controls the heterogeneous robots 30 again (S57).

As each edge server 20 upgrades the base model based on its own feedback, the most optimized version modeling for the environment may be enabled. In addition, as the base model is upgraded by receiving the based model from the cloud server 10, it requires not much computation to generate the base model itself.

Further, since each activation function and change option are prestored, the base model may be upgraded by simply changing them, thereby facilitating the upgrade.

As such, an upgraded base model in a specific edge server 20 may be shared with other edge servers 20 that control similar robots 30.

In detail, referring to FIG. 9, when a model upgrade occurs in an edge server A (21) (S200), the edge server A (21) transmits change history of the model upgrade to the cloud server 10 (S201).

Here, the edge server A (21) may notify that an event requiring communication with other edge servers (22) has occurred.

That is, based on the fact that a lot of errors has occurred in the model and similar errors are expected to occur in other edge servers (22), the need for upgrading the model to prevent such errors is transmitted to the cloud server 10.

In addition, the edge server A (21) transmits a changed point and a model name of the associated robot 30, instead of the entire upgraded base model (S202).

That is, by transmitting only information about the upgraded change point and the related robot model, the cloud server 10 selects (or identifies), based on the information, edge servers (20) that require the application of the upgraded base model (S203).

In other words, the cloud server 10 may select other edge servers (22) that control the same robot 30, and may also select an edge server (22) that mainly uses the upgraded model.

In this case, the cloud server 10 may only perform screening for the edge servers (22) in the zone to which the upgraded edge server A (21) belongs by referring to the zone-specific relevance of each edge server 20, but the present disclosure is not limited thereto.

As such, the cloud server 10 selects the edge servers (22) and transmits information about the selected edge servers (22) to the edge server A (21) (S204).

The edge server A (21) receives information about the selected edge servers (22), namely, IP addresses or the like, and prepares transmission of the upgraded base model to the selected edge servers (22).

Meanwhile, the cloud server 10 schedules transmission of the upgraded base model to the selected edge servers (22) (S205).

That is, the cloud server 10 notifies each selected edge server (22) that an upgrade of the base model has occurred, and transmission of the upgraded base model from the edge server A (21) is scheduled.

In response to the notification from the cloud server 10, each of the selected edge servers (22) prepares to receive the upgraded base model.

In this case, the edge server A (21) may notify the selected edge servers (22) of the deep learning model change and a model name of the associated robot 30, and may request update preparation for the upgraded base model (S206).

The selected edge servers (22) move the currently stored deep learning base model to 'temp' to temporarily store it (S207).

Next, each of the selected edge servers 22 sends a reply to the edge server A (21) of 'update preparation ready' and transmits an update request (S208).

The edge server A (21) distributes the upgraded deep learning model to each of the selected edge servers (22) (S209).

Upon receiving the upgraded deep learning model, the selected edge servers (22) store and test-run the model.

When there is no error in executing the upgraded deep learning model, 'temp' is discarded to delete the previous deep learning base model (S210).

After updating the deep learning base model, the selected edge servers 22 notify the cloud server 10 of the updated model version as version 2 (V2) (S211).

At this time, the edge server A (21) is also notified of the completion of the model update (S212).

As such, the selected edge server (22) tunes and executes the base model received from the cloud server 10, and when upgrade information and selection information from another edge server 20 is received, the selected edge server (22) may receive the upgraded model to update the tuned base model to the next version and control the robots 30 in the corresponding area with the upgraded version.

In addition, even when controlling using the upgraded version, each edge server 20 may upgrade the model by deep learning to the next version by counting a predetermined data number and determining an error, as shown in FIG. 8, and this may also be shared with other edge servers 20.

In embodiments of the present disclosure, as intelligence is shared between two or more edge servers 20, continuous upgrades of the model may be allowed by sharing models evolved in their respective environments.

Thus, as only feature points and history are stored in the cloud server 10 without storing models to be upgraded, the storage space of the cloud server 10 may be secured.

In addition, adaptive modeling may be enabled as an upgrade is made by the edge server 20 that actually requires the upgrade.

FIG. 10 is a schematic diagram illustrating a cloud and edge-based environment according to another embodiment of the present disclosure, and FIG. 11 is a detailed diagram for explaining a heterogeneous robot system based on one edge server in the environment of FIG. 10.

Referring to FIG. 10, a cloud-based robot system of this embodiment may include a cloud server 10, a plurality of edge servers 20, and a plurality of robots 30, like the previous embodiment of FIG. 1.

The configurations of the cloud server 10, the plurality of edge servers 20, and the plurality of robots 30 are the same as those of FIG. 1 and are therefore omitted.

Here, heterogeneous or homogeneous robots 30 deployed in each space may communicate with the edge server 20, and the cloud server 10 set up in the corresponding space, and may interact with users in home or business environment to provide assigned services.

Preferably, the cloud robot system includes a plurality of heterogeneous robots 30 and an edge server 20, which are set up in each space, and a cloud server 10 that communicates with each of the edge servers 20 and heterogeneous robots 30 to provide the integrated management.

The cloud server 10 designs/generates a model for controlling a plurality of physically distributed robots 30, and then distributes the model to edge servers 20 set up in respective spaces.

Specifically, the cloud server 10 generates a base model or engine. The base model or engine is a general-purpose model or general-purpose engine applied to the heterogeneous robots 30 in the environment of a heterogeneous robot system, and is not designed as a specific model for a particular situation.

The cloud server 10 may package by generating a plurality of functionally or structurally distinct models or engines for the plurality of heterogeneous robots 30, respectively, and may perform complex machine learning/deep learning that is difficult to implement in the edge server 20.

Machine learning, which is a branch of artificial intelligence (A1), refers to a technology that generates models that can generalize, classify, and evaluate numerous data based on algorithms and techniques that enable computers to learn on their own.

By generating such a base model and distributing it to a plurality of edge servers 20, it is possible to control a plurality of physically separated heterogeneous robots 30.

In addition, for each local environment, namely, each space in which a plurality of heterogeneous robots 30 are deployed, the cloud server 10 may perform deep learning by receiving information about the environment from the edge server 20, receiving error information from the robots 30 in real time, and comprehensively determining the same to upgrade the base model to be optimized for the environment.

The cloud server 10 may transmit the upgraded model to the edge server 20 of the space to execute the upgraded model, thereby controlling the respective heterogeneous robots 30 with a model optimized for the space.

In addition, the cloud server 10 may classify and group the plurality of edge servers 20 into zones and manage them the same as that of FIG. 2.

An edge server 20 is set up in each space as shown in FIG. 11, and tunes the base model into an adaptive model to be suitable for a plurality of heterogeneous or homogeneous robots 30 deployed in the corresponding space, and may control each robot 30 by tuning a newly received upgraded base model.

In this embodiment, the cloud server 10 performs base deep learning modeling, which is a general-purpose model or engine for heterogeneous robots 30 and services, and the edge server 20 receives the base model and tunes the base model to be suitable for the corresponding space to be executed, and the cloud server 10 receives error information from the robots 30 in the space to upgrade the base model and provides it back to the edge server 20.

Specifically, by using training data of the corresponding space previously collected from the various plurality of robots 30, the cloud server 10 performs deep learning/machine learning to customize and upgrade the base deep learning model to be suitable for each robot 30 and service.

In this case, the cloud server 10 may also consider various types of environmental information about the corresponding space, so as to upgrade the base deep learning model to an optimal customized deep learning model for each space.

In addition, the plurality of heterogeneous robots 30 may send feedback (errors, performance information, etc.) to the cloud server 10, and the cloud server 10 may share the upgraded model to another edge server 20. Once the upgraded model is shared to another edge server 20, the another edge server 20 may remove its existing model, update it to the shared model, and tunes and executes it to be suitable for the robots 30 in a corresponding space.

As shown in FIG. 11, one edge server 20 is disposed in a distinct virtual space or physically separate space A1, and controls a plurality of robots 30, which are deployed in the space A1 to provide services, and the services provided by the robots 30.

In one example, as shown in FIG. 11, an edge server 21 may control a plurality of robots 30 (31, 32, 33, 34, 35) that provide services in a smart restaurant, and the plurality of robots 30 may include a guide robot, an order-taking robot, a serving robot, an entertainment robot, a cleaning or cooking robot, a barista robot, and the like.

As such, the plurality of heterogeneous robots 30 deployed in the space A1 are subordinate to the corresponding edge server 21 and provide services while transmitting and receiving data to and from the edge server 21 and the cloud server 10.

The cloud server 10 and the edge server 20 may generally have the similar configuration, and the configuration is the same as that of FIG. 4, so a detailed description thereof will be omitted.

A processor 100 of the cloud server 10 may analyze various data obtained from the plurality of robots 30 and perform appropriate processing, and may perform machine learning/deep learning on its own to learn to upgrade the corresponding base deep learning model.

Based on the data received from the robots 30, data input by a user, and the like, the cloud server 10 may perform machine learning/deep learning, and then may transmit an upgraded model to the edge server 20.

A processor 100 of the edge server 20 may analyze each of the data obtained from the plurality of robots 30, and may apply the respective analyzed data to corresponding robots.

Meanwhile, the cloud server 10 or the edge server 20 may include a communication unit 120, and as described above, various communications are possible depending on the communication method required in the environment. In particular, communication between the robot 30 and the edge server 20, between the edge server 20 and the cloud server 10, between edge servers 20, and between the robot 30 and the cloud server 10 may be performed using a 5G network, and the algorithm itself of large-scale deep learning modeling may be transmitted and received therebetween.

Meanwhile, various heterogeneous or homogeneous robots 30 deployed in each space may transmit data regarding space, objects, and usage to the edge server 20.

Here, the data regarding space and objects may be data related to the recognition of the space and objects recognized by the robot 30, or image data regarding the space and the objects acquired by an image acquisition unit.

In some embodiments, the robot 30 and the cloud server 10 may include artificial neural networks (ANNs) in the form of software or hardware trained to recognize at least one of the attributes of objects, such as users, voice, the properties of space, obstacles, and the like.

According to an embodiment of the present disclosure, the cloud server 10 may include a deep neural network (DNN) such as a convolutional neural network (CNN), a recurrent neural network (RNN), or a deep belief network (DBN) trained by deep learning. For example, the processer of the cloud server 10 may be equipped with a deep neural network structure (DNN) such as a convolutional neural network (CNN).

In addition, the data regarding usage is data obtained by the use of the robot 30, and may correspond to usage history data, a detection signal obtained from a sensor unit 110, and the like.

A trained deep neural network (DNN) structure may receive input data for recognition, and the robot 30 may recognize the attributes of people, objects, and spaces contained in the input data and output the results.

In addition, the trained deep neural network (DNN) structure may receive input data for recognition, and may analyze and learn data related to the usage of the robot 30 to recognize a usage pattern, a usage environment, etc.

Meanwhile, the data regarding space, objects, and usage may be transmitted to the edge server 20 and/or the cloud server 10 through a communication unit of the robot 30.

The cloud server 10 may train a deep neural network (DNN) based on the received data, and then may transmit updated deep neural network (DNN) structure data to the corresponding edge server 20 for updating.

The robot 30 according to one embodiment may be a mobile robot 30 that travels in the space and performs a set service or mission.

Such a robot 30 may include a controller configured to control the overall operation, a storage unit to store various data, and a communication unit configured to transmit and receive data to and from other devices such as the cloud server 10 and the edge server 20.

The controller may control the communication unit and various sensors in the robot 30, thereby controlling the overall operation of the robot 30.

The communication unit may include at least one communication module so that the artificial intelligence robot 30 is connected to the Internet or a predetermined network and communicate with other devices.

In addition, the communication unit may be connected to communication modules provided in the edge server 20 and the cloud server 10 so as to process data transmission and reception between the robot 30 and the edge server 20 and/or the cloud server 10.

The configuration of the robot 30 of this embodiment is the same as that of the previous embodiment of the robot, so a detailed description thereof will be omitted.

The controller of the robot 30 may control transmission of an operating state or a user input of the artificial intelligence robot 30 to the edge server 20 and the cloud server 10 through the communication unit.

As shown in FIG. 11, robots 30 assigned with specific tasks, such a serving robot, an order-taking robot, and a guide robot, may be deployed in one space, and may have a separate work section corresponding to each task.

Each of the robots 30 may be controlled by the edge server 20 according to the assigned task.

Hereinafter, control of the robot system including heterogeneous robots 30 will be described in detail with reference to FIGS. 12 and 13.

FIG. 12 is a conceptual diagram illustrating modeling of a cloud server, an edge server and a robot, according to another embodiment of the present disclosure, and FIG. 13 is an overall flowchart of a robot cloud system of FIG. 12.

Referring to FIG. 13, a robot cloud system according to this embodiment is configured such that model generation/distribution/sharing is made between a plurality of edge servers 20 in communication with the cloud server 10.

In detail, the cloud server 10 generates a base model that can be universally applied to all robots 30 under the control of the cloud server 10, namely, robots 30 that are controlled by the cloud server 10 or connected to the cloud server 10 to store information, or robots 30 that are connected to the edge server 20 (S300).

That is, the cloud server 10 performs machine learning/deep learning in the processor 100 to generate a model that can be universally used for control of a plurality of heterogeneous robots 30.

When the heterogeneous robots 30 controlled through the edge server 20 that communicates with the cloud server 10 are a serving robot, a barista robot, an order-taking robot, a cooking robot, and a guide robot, as shown in FIG. 12, an object recognition model 101, a navigation model 102, a voice recognition model 103, a location recognition model 104, an emotion recognition model 105, a control intelligence model 106, and the like may be generated as models that can be selectively used for the respective robots 30.

The model (101 to 106) is selectively applicable to a specific robot 30, and the cloud server 10 generates all models 101 to 106 required as the concept of union.

This respective deep learning modeling provides a general-purpose, packaged base model to the edge servers 20, and each edge server 20 is trained through an optimizing process by tuning/upgrading based on its environment and robot 30.

Specifically, the cloud server 10 generates a packaged base model and distributes the packaged base model to each registered edge server 20 (S300).

Meanwhile, the cloud server 10 proceeds with grouping to register a plurality of edge servers 20 and categorize them into specific zones (S310).

Zones are set according to the distance or response time of each registered edge server 20, and the cloud server 10 transmits information about zones allocated to the plurality of edge servers 20 in the same zone and information about other edge servers 20 registered in the same zone.

In this case, when a service registration request is received from a new edge server 2 (22) (S311), the cloud server 10 performs zone allocation for the new edge server 2 (22) (S320).

That is, the cloud server 10 uses an IP address of the new edge server 2 (22) to determine a physical location of the edge server 2 (22), and measures a response time via ping or traceroute.

The cloud server 10 allocates the new edge server (20) to a specific zone by reading a distance from the cloud server 10 based on the response time or physical location (S320).

The cloud server 10 transmits information about the zone allocation, for example, a range of the zone, and other edge servers (21, 23, . . . ) registered in the zone to the new edge server 2 (22), and transmits information that the new edge server 2 (22) has been registered to the other edge servers (21, 23, . . . ) in the zone.

Next, the cloud server 10 distributes the packaged base model to the registered edge server 2 (22) (S321).

Here, the distributed base model is the packaging of models or modules related to various functions for managing or controlling various heterogeneous robots 30, and an application program for upgrading or tuning the base model may also be distributed when the base model is transmitted.

Upon receiving the base model, the edge server 2 (22) tunes it to be suitable for the plurality of heterogeneous robots 30 controlled by the edge server 2 (22) (S330).

When the new edge server 22 controls only a serving robot 30, an order-taking robot 30, and a guide robot 30, as shown in FIG. 5, the tuning may be performed such that, of the received base model, a control intelligence model is not activated and other models, namely, an object recognition model 101, a navigation model 102, a voice recognition model 103, a location recognition model 104, and an emotion recognition model 105 are only activated.

That is, tuning is defined as a process of activating only necessary models in each area and storing unnecessary models in an inactive state.

As the new edge server 22 selects and activates only the models required for the heterogeneous robots 30 in zones A1, A2 and A3, computational programs may be reduced to thereby reduce cost and time.

For example, in the case of a first edge server 21 of FIG. 12, when a serving robot, a barista robot, an order-taking robot, a cooking robot, and a guide robot are deployed in the zone A1, all models packaged as a base model may be activated.

When there are only a barista robot, an order-taking robot, and a cooking robot, the movement of the robots is not required, and thus, a third edge server 23 may control without activating a navigation model 102, a location recognition model 104, and the like. (S331).

Each of the heterogeneous robots 30 is controlled according to the tuned base model and provide a service to customers while performing its assigned task (S340).

Here, each of the heterogeneous robots 30 transmits input, output, and error values for each operation to the cloud server 10 to proceed with a report (S341).

Next, the cloud server 10 may execute the base model tuned by the edge server 20 to perform control of each of the heterogeneous robots 30, and may upgrade the base models to fit the respective robot environments when a predetermined amount of data is obtained (S350).

The upgrade of the base model will be described in detail later with reference to FIGS. 14 and 15.

When the cloud server 10 upgrades the base model of one edge server 20, the cloud server 10 transmits the upgraded model to the edge server 20 (S351).

In this case, upon receiving the upgraded base model, the edge server 20 may delete its previous base model and may convert and update it to the upgraded base model to control the robots 30 in the allocated area (S352).

As the control system of heterogeneous robots 30 using the cloud server 10 of the present disclosure includes an edge server 20 for controlling robots 30 at a distance, and each edge server 20 uses a base model provided by the cloud server 10 with appropriate tuning, and upgrades the base model by performing machine learning/deep learning.

As such, the cloud server 10 may transmit an upgraded base model specific to each environment to the edge server 20 in the space, and may transmit it to another edge server 20 that requires it.

As the base model is upgraded by the cloud server 10, the algorithmic computation of machine learning/deep learning used for the base model upgrade is intensively performed by the cloud server 10, thereby reducing the computational burden on individual edge servers.

Thus, the individual edge servers 20 may function as a simple processor or controller, resulting in reduced computation time for transmitting and receiving commands to and from each robot 30. In addition, the size of module and the size of computation of the individual edge servers 20 may be reduced, thereby reducing economic burden in each edge server 20.

Further, as the upgraded base model is sent directly from the cloud server 10 to another edge server 20 that requires it, the selection of another edge server 20 that requires the upgrade and transmission of the upgraded base model may be performed in one module, thereby reducing unnecessary traffic.

Hereinafter, a base model upgrade by the cloud server 10 and sharing of the upgraded base model will be described with reference to FIGS. 14 and 15.

FIG. 14 is a flowchart illustrating that the cloud server of FIG. 13 upgrades a base model for one edge server, and FIG. 15 is a flowchart illustrating a method of sharing an upgraded model to another edge server, according to another embodiment of the present disclosure.

First, referring to FIG. 14, for a base model tuned by the edge server 20, the cloud server 10 sets a threshold value and minimum data number for deep learning error training from each of a plurality of robots 30 (S400).

Specifically, the cloud server 10 may set a threshold value Eth and a minimum data number N.

The threshold value Eth may be defined as a reference value for selecting values classified as error values among the values received for respective base models, and the minimum data number N may be defined as the minimum data number available for training the deep learning model.

Here, the threshold value Eth and the minimum data number N may be set differently for each model.

Next, the cloud server 10 receives an input value, transmitted by the edge server 20, and an output value and an error value E from each of the robots 30 while the edge server 20 performs control of the plurality of heterogeneous robots 30 using the respective models (S401).

These input values, the output values, and the error values E may be received whenever each service or function progresses, and may be received whenever an event occurs.

The cloud server 10 stores the received data together with the deep learning model and training data corresponding to each local environment, namely, the edge server 20.

Next, the cloud server 10 monitors the characteristics of each local environment to determine whether the deep learning base model needs to be upgraded.

The cloud server 10 analyzes the training completeness of the deep learning model in the local environment for each edge server 20, a user response, and patterns of the robot 30 and a user to determine whether to upgrade the current deep learning model or generate a model of a new function.

This determination may be made by analyzing a pattern in the user response to the output of the robot 30 (S402).

That is, when there is no pattern in the user response, it may be determined as a general error situation, and when the error value E exceeding the threshold value Eth is the minimum data number N or more, it may be determined as a situation to upgrade the current deep learning model (S403).

In other words, when the error value E is above the threshold value Eth, it is determined to be true and is saved as training data, and the data number (n=n+1) is counted.

When the counted data number does not satisfy the minimum data number N while continuously determining whether the error value E for the data is greater than the threshold value Eth, the next data is read to determine whether the error value E is true or false again. When the data number of an error value exceeding the threshold value Eth satisfies the minimum data number N, it is determined that deep learning model training is available, and the model is upgraded through deep learning training (S404).

In this case, the cloud server 10 may perform the upgrade by changing the number of nodes, the number of layers, and activation function values along with the added error values E. Here, the activation function may be used by storing a plurality of candidate groups in advance.

In one example, while applying a corresponding voice recognition model, when an error value exceeding a minimum data value occurs, it may be programmed to minimize the error by applying another activation function.

The upgraded model may be transmitted to the edge server 20 as version 2 (V2), and the edge server 20 may use it as a replacement for the previous version of version 1 (V1) (S405).

Meanwhile, the cloud server 10 may receive information about the local environment of each space from the edge server 20, and may combine the information with data from the robot to determine whether a new function is required for the local environment (S402).

The cloud server 10 analyzes the training completeness of the deep learning model in the local environment for each edge server 20, a user response, and patterns of the robot 30 and a user to determine whether to generate a new model of a new function different from the current deep learning model.

This determination may be made by analyzing a pattern in the user response to the output of the robot 30.

That is, when a pattern is detected in the user response, and when it is determined that there is an intention in the pattern of the user response, it is determined that a new function is required.

Accordingly, the cloud server may perform deep learning/machine learning to generate a deep learning base model that can control a new function for a new response pattern.

The new deep learning model is packaged together with other upgraded models and is then transmitted to the edge server 20.

The new model transmitted in this way may be stored in the memory 101 of the edge server 20 as version 2 (V2), and may be used as a replacement for the previous version of version 1 (V1).

When a change is made in the upgraded model, the edge server 20 transmits the change to the cloud server 10 and controls the heterogeneous robots 30 again with the upgraded model.

As the cloud server 10 performs modeling tailored to each environment based on the environment information from the edge server 20 and real-time data from the robot, the most optimized version of modeling is achieved.

In addition, by receiving environment information not only from the robot but from the edge server 20 and performing modeling based on the analysis of a user response, it is possible to upgrade the model that reflects the pattern analysis of the user response.

Further, since each activation function and change option are prestored, the base model may be upgraded by simply changing them, thereby facilitating the upgrade.

As such, an upgraded base model for a specific environment in which a specific edge server 20 is located may be shared to another edge server 20 that controls similar robots 30.

In detail, referring to FIG. 15, the cloud server 10 generates and distributes a base model that can be universally applied to all robots 30 controlled by the cloud server 10, i.e., robots 30 that are controlled by the cloud server 10 or connected to the cloud server 10 to store information, or robots 30 connected to the edge server 20 (S500).

That is, the cloud server 10 performs machine learning/deep learning in the processor 100 to generate a model that can be universally used for the control of a plurality of heterogeneous robots 30.

This respective deep learning modeling provides a general-purpose, packaged base model to the edge servers 20, and each edge server 20 optimizes the environment by tuning the base model according to its space and robot 30 (S501).

Upon receiving the base model, an edge server A (21) tunes the base model to be suitable for the plurality of heterogeneous robots 30 controlled by the edge server A (21).

Each edge server 20 controls the heterogeneous robots 20 in the corresponding space, namely, an allocated space in which a plurality of heterogeneous robots are deployed, with the tuned base model, and each robot 1 (30) provides an output to a user for performing a task that is set according to input from the edge server (S502).

Each robot 30 transmits, along with input and output, error values generated while performing the set task to the cloud server 10 in real time (S503).

The cloud server 10 obtains data from error reporting from each of the robots 30 and environment information from the edge server 20, and combines them to perform an upgrade of the deep learning model for the edge server A (21).

Accordingly, an upgraded deep learning model is generated for the corresponding environment, namely, the space to which the edge server A (21) is allocated (S504).

When a model upgrade for the edge server A (21) occurs, the cloud server 10 transmits the upgraded version of the deep learning model to the edge server A (21) (S505).

The edge server A (21) performs control of the heterogeneous robots by changing the model to the upgraded model (S506), and the heterogeneous robots 30 perform tasks according to the control by the new model while sending an error report to the cloud server 10 (S506).

Meanwhile, when an upgrade model for the edge server A (21) is generated, based on the fact that many errors have occurred in the model, and similar errors are expected to occur in other edge servers 22, the cloud server 10 performs screening for another edge server (22) that requires a model upgrade to prevent such errors (S511).

That is, the cloud server 10 selects or identifies another edge server (22) with a similar environment based on the upgraded model, namely, a changed point in the upgrade and a model name of the associated robot 30.

In other words, the cloud server 10 may select other edge servers (22) that control the same robot 30, and may also select edge servers (22) that mainly use the upgraded model.

In this case, the cloud server 10 may select an edge server 20 that has a space similar to the current edge server 20, namely, an edge server 20 having a similar landscape feature, but the present disclosure is not limited thereto.

In addition, the cloud server 10 may only select the edge servers (22) in the zone to which the upgraded edge server A (21) belongs by referring to the zone-specific relevance of each edge server 20, but the present disclosure is not limited thereto.

As such, the cloud server 10 selects the edge server 20 and transmits an update preparation request to the edge server (22) (S511).

Each selected edge server 22 is notified that an upgrade of the base model has occurred, and each of the selected edge servers 22 prepares to receive the upgraded base model in response to the notification from the cloud server 10.

In this case, the cloud server 10 may notify the selected edge servers (22) of the deep learning model change and a model name of the related robot 30, and may request preparation for an update to the upgraded base model.

The selected edge servers (22) move the currently stored deep learning base model to 'temp' to temporarily store it (S512).

Next, the selected edge servers 22 send a reply to the cloud server 10 of 'update preparation ready' and transmit an update request (S513).

The cloud server 10 distributes the upgraded deep learning model to each selected edge server (22) (S514).

Upon receiving the upgraded deep learning model, the selected edge servers (22) store and test-run the model.

When no error occurs in executing the upgraded deep learning model, 'temp' is discarded to delete the previous deep learning base model (S515).

In this way, the cloud server 10 is notified of the version of the updated model as version 2 (V2) (S516), and an update of the deep learning base model is performed to control the robot 30 (S517).

As such, the selected edge server (22) tunes and executes the base model received from the cloud server 10, and when upgrade information and selection information from the cloud server 10 is received, the selected edge server (22) may update the tuned base model to the next version and control the robots 30 in the corresponding area with the upgraded version.

In addition, even when controlling using the upgraded version, the cloud server 10 may upgrade the model by deep learning to the next version by counting a predetermined data number and determining an error, as shown in FIG. 14, and this may also be shared with the edge servers 20.

According to the embodiments, the cloud server 10 may perform upgrade to a model optimized for a specific environment while controlling the edge server 20 and the robots 30.

In addition, as the upgraded model is shared among two or more edge servers, continuous upgrades of the model is allowed by sharing models evolved in their respective environments. A robot system according to the present disclosure may be non-limited by the configurations and methods of the embodiments mentioned in the foregoing description. And the embodiments mentioned in the foregoing description can be configured in a manner of being selectively combined with one another entirely or in part to enable various modifications.

In addition, a control method of the robot system according to the present disclosure can be implemented as processor-readable codes on a processor-readable recording medium. The processor-readable recording medium may include all kinds of recording devices capable of storing data readable by a processor. Examples of the processor-readable recording medium include ROM, RAM, CD-ROM, a magnetic tape, a floppy disk, an optical data storage device, and the like, and may also be implemented in the form of a carrier wave (e.g., transmission over the Internet. Furthermore, as the processor-readable recording medium is distributed to a computer system connected via network, processor-readable codes can be saved and executed according to a distributive system.

Although the preferred embodiments of the present disclosure have been disclosed for illustrative purposes, those skilled in the art will appreciate that various modifications, additions and substitutions are possible, without departing from the scope of the disclosure as disclosed in the accompanying claims. Such modifications should not be individually understood from the technical spirit or prospect of the present disclosure.

| [Description of reference numeral] | |
|---|---|
| 10: Cloud server | 20: Edge server |
| 30: Robot | |

What is claimed is:

1. A cloud-based robot system comprising:

a plurality of robots;

a cloud server generating a control base model applicable to the plurality of robots; and a plurality of edge servers classified by the cloud server into a plurality of groups based on distance from the cloud server, wherein each edge server of the plurality of edge servers is allocated to a corresponding space of a plurality of spaces, communicates with the cloud server, and receives the control base model, the edge server controlling a corresponding subset of the plurality of robots deployed in the corresponding space based on the control base model, wherein the corresponding subset of the plurality of robots comprises different types of robots in the corresponding space, wherein the edge server upgrades the control base model according to the different types of robots in the corresponding space to control the corresponding subset of the plurality of robots based on the upgraded control base model, and wherein the edge server directly transmits the upgraded control base model only to one or more edge servers that are in a same group as the edge server, such that transmission of the upgraded control base model is restricted to edge servers within the same group.

2. The cloud-based robot system of claim 1, wherein the control base model is packaged with respective control models for a plurality of functions of the different types of robots.

3. The cloud-based robot system of claim 2, wherein the cloud server receives error values from the plurality of robots in real time, and, when an error value, from one of the plurality of robots, exceeding a threshold value occurs a predetermined number or more, performs deep learning error training to generate a cloud-server upgraded control base model and transmits the cloud-server upgraded control base model to the edge server.

4. The cloud-based robot system of claim 3, wherein the cloud server obtains environment information from the edge server and performs deep learning error training on the control base model to generate the cloud-server upgraded control base model.

5. The cloud-based robot system of claim 4, wherein the cloud server selects another edge server to apply the cloud-server upgraded control base model so as to transmit the cloud-server upgraded control base model to the selected another edge server.

6. The cloud-based robot system of claim 5, wherein, when an error value, from one of the plurality of robots, exceeding a threshold value occurs a predetermined number or more and a pattern in a user response to the error value is detected, the cloud server generates a deep learning model for a new function.

7. The cloud-based robot system of claim 1, wherein the edge server executes the control base model by tuning the control base model according to the different types of robots controlled by the edge server.

8. The cloud-based robot system of claim 7, wherein the edge server performs deep learning error training on the tuned control base model to generate the upgraded control base model.

9. The cloud-based robot system of claim 8, wherein the cloud server obtains information about the upgraded control base model, and selects the one or more edge servers to apply the upgraded control base model so that the upgraded control base model is transmitted directly from the edge server to the one or more edge servers.

10. The cloud-based robot system of claim 9, wherein the cloud server selects the one or more edge servers including a robot to which the upgraded control base model is to be applied, so as to transmit the upgraded control base model.

11. The cloud-based robot system of claim 10, wherein, the edge server, when an error value exceeding a threshold value occurs a predetermined number or more while executing the control base model, generates the upgraded control base model by performing the deep learning error training.

12. The cloud-based robot system of claim 1, wherein the edge server directly transmits the upgraded control base model exclusively to edge servers that are in the same group as the edge server.

13. A cloud-based robot control method for controlling a plurality of robots, the method comprising:

generating, by a cloud server, a control base model applicable to the plurality of robots;

classifying, by the cloud server, a plurality of edge servers into a plurality of groups based on distance from the cloud server, wherein each edge server of the plurality of edge servers is allocated to a corresponding space of a plurality of spaces;

distributing, by the cloud server, the control base model to the plurality of edge servers, wherein each edge server controls a corresponding subset of the plurality of robots deployed in the corresponding space based on the control base model, wherein the corresponding subset of the plurality of robots comprises different types of robots in the corresponding space;

upgrading, by a first edge server of the plurality of edge servers, the control base model according to the different types of robots in the corresponding space;

controlling, by the first edge server, the corresponding subset of the plurality of robots based on the upgraded control base model; and directly transmitting, by the first edge server, the upgraded control base model only to one or more edge servers that are in a same group as the first edge server, such that transmission of the upgraded control base model is restricted to edge servers within the same group.

14. The method of claim 13, wherein the generating of the control base model comprises generating and packaging respective control models for a plurality of functions of the different types of robots.

15. The method of claim 13, wherein the upgrading of the control base model comprises:

tuning the control base model according to the different types of robots controlled by the first edge server; and generating the upgraded control base model by performing deep learning error training on the control base model that is tuned.

16. The method of claim 13, further comprising:

obtaining, by the cloud server, information about the upgraded control base model;

selecting the one or more edge servers to apply the upgraded control base model; and transmitting information of the one or more edge servers to the first edge server where the upgrading is performed.

17. The method of claim 13, further comprising:

receiving, by the first edge server, error values from the corresponding subset of the plurality of robots while controlling the corresponding subset of the plurality of robots using the upgraded control base model;

upgrading, by the cloud server, based on an error value from a specific robot in a specific space, the control base model to a cloud-server upgraded control base model for the specific space; and distributing the cloud-server upgraded control base model to an edge server allocated to the specific space, so as to control the specific robot using the cloud-server upgraded control base model.

18. The method of claim 17, wherein the upgrading of the control base model by the cloud server comprises, when the cloud server receives an error value from the specific robot that exceeds a threshold value a predetermined number or more and a pattern in a user response to the error value is detected, generating a deep learning model for a new function.

* * * * *